US012214587B2

(12) United States Patent
Taruya et al.

(10) Patent No.: US 12,214,587 B2
(45) Date of Patent: Feb. 4, 2025

(54) CARTRIDGE

(71) Applicant: SEIKO EPSON CORPORATION, Tokyo (JP)

(72) Inventors: Keisuke Taruya, Shiojiri (JP); Taishi Sasaki, Matsumoto (JP); Akio Ishimoto, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 166 days.

(21) Appl. No.: 18/180,639

(22) Filed: Mar. 8, 2023

(65) Prior Publication Data

US 2023/0286302 A1 Sep. 14, 2023

(30) Foreign Application Priority Data

Mar. 9, 2022 (JP) ................................ 2022-036630

(51) Int. Cl.
*B41J 3/407* (2006.01)
*B41J 15/04* (2006.01)

(52) U.S. Cl.
CPC ........... *B41J 15/044* (2013.01); *B41J 3/4075* (2013.01)

(58) Field of Classification Search
CPC .............................. B41J 3/4075; B41J 15/044
See application file for complete search history.

(56) References Cited

U.S. PATENT DOCUMENTS

2014/0037359 A1* 2/2014 Nakajima ................ B41J 11/70 400/621
2016/0297217 A1 10/2016 Sasaki
2020/0207107 A1* 7/2020 Ishimoto ................ B41J 3/4075
2020/0398595 A1* 12/2020 Yanagisawa ........... B41J 15/044

FOREIGN PATENT DOCUMENTS

JP 2014-184558 A 10/2014

* cited by examiner

*Primary Examiner* — Anh T Vo
(74) *Attorney, Agent, or Firm* — Oliff PLC

(57) ABSTRACT

A cartridge configured to be mounted on a tape printer, the cartridge including a cartridge case, in which the cartridge case is provided with a tape feed port through which a tape fed from an accommodated tape roll is fed out of the cartridge case, a tape insertion port into which the tape is configured to be inserted in a first direction from one end portion in a width direction of the tape, and a tape guide that is positioned in the first direction with respect to the tape insertion port and guides feeding of the tape by the tape printer, the tape guide is provided with a protruding portion that comes into contact with the tape, and a tape guide chamfered portion is provided at an end portion of the protruding portion in a second direction opposite to the first direction.

8 Claims, 20 Drawing Sheets

CARTRIDGE

The present application is based on, and claims priority from JP Application Serial Number 2022-036630, filed Mar. 9, 2022, the disclosure of which is hereby incorporated by reference herein in its entirety.

BACKGROUND

1. Technical Field

The present disclosure relates to a cartridge that can be mounted on a tape printer.

2. Related Art

In the related art, as disclosed in JP-A-2014-184558, there has been known a tape cartridge including a label tape, an ink ribbon, a platen roller, and a cartridge case accommodating these components. The cartridge case is provided with a pull-in prevention portion that prevents a leading edge of the label tape from being pulled into the cartridge case by pinching the label tape with the platen roller.

In the cartridge case provided with a tape insertion port into which the tape is inserted from one end portion in the width direction of the tape, there is a possibility that the inserted tape may get caught in a tape guide provided in the first direction with respect to the tape insertion port, when the tape is inserted in the first direction from the tape insertion port.

SUMMARY

According to an aspect of the present disclosure, there is provided a cartridge configured to be mounted on a tape printer, the cartridge including a cartridge case configured to accommodate a tape roll around which a tape is wound, in which the cartridge case is provided with a tape feed port through which the tape fed from the tape roll accommodated in the cartridge case is fed out of the cartridge case, a tape insertion port into which the tape pulled out from the tape roll is configured to be inserted in a first direction from one end portion in a width direction of the tape, so that a leading edge of the tape comes out of the cartridge case from the tape feed port, when the tape roll is accommodated in the cartridge case, and a tape guide that is positioned in the first direction with respect to the tape insertion port and guides feeding of the tape by the tape printer, the tape guide is provided with a tape contact portion that comes into contact with the tape fed to the tape feed port, and a chamfered portion is provided at an end portion of the tape contact portion in a second direction opposite to the first direction.

DESCRIPTION OF EXEMPLARY EMBODIMENTS

Hereinafter, a cartridge 1, which is an embodiment of the cartridge, will be described with reference to the accompanying drawings. Hereinafter, directions based on the XYZ orthogonal coordinate system illustrated in each drawing are used for description, but these directions are for convenience of description only and do not limit the following embodiments in any way. In addition, the number of each component is merely an example, and does not limit the following embodiments in any way.

Schematic Configuration of Cartridge and Tape Cartridge

Figure 1:
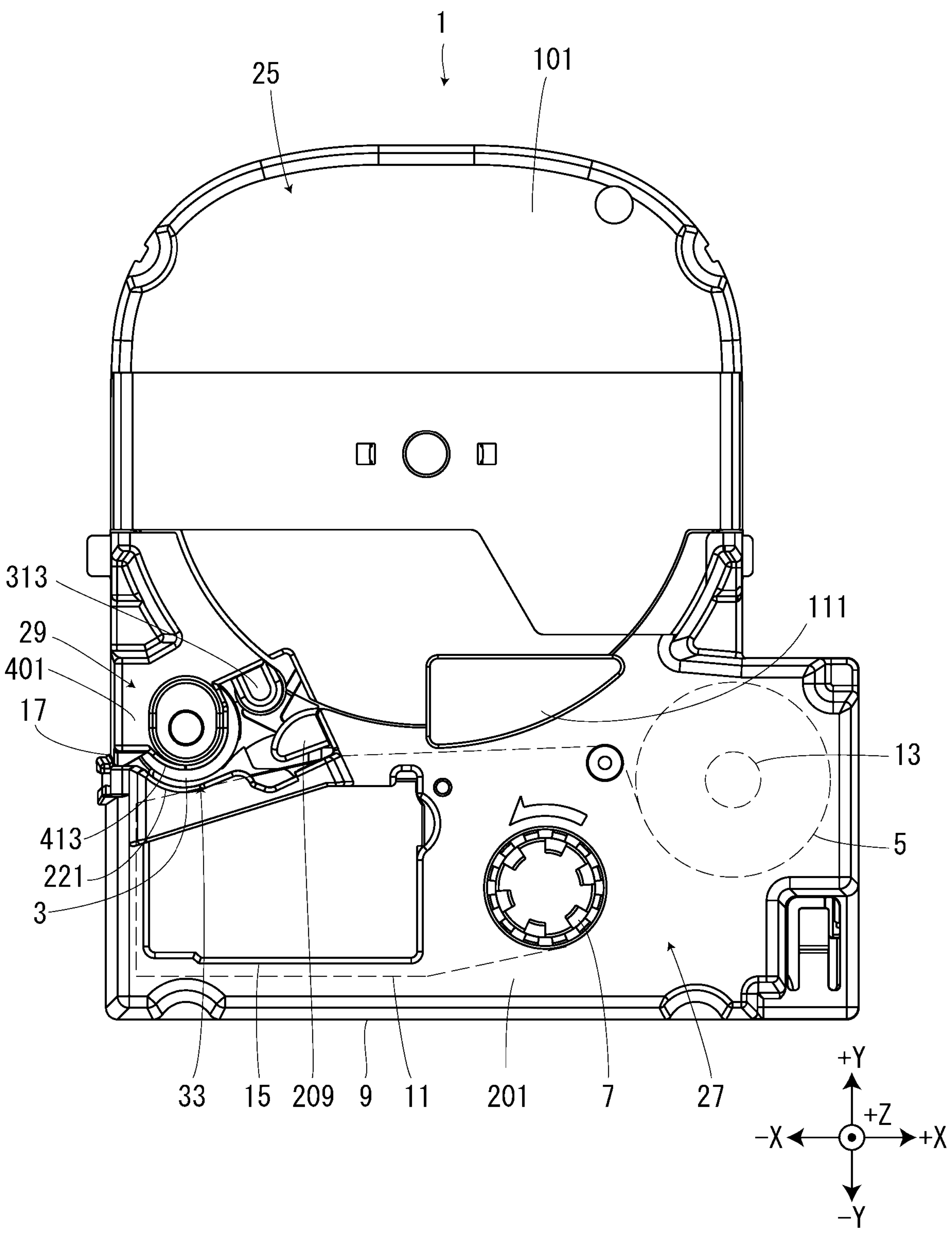
FIG. 1 is a view of a cartridge viewed from the +Z direction.
Figure 2:
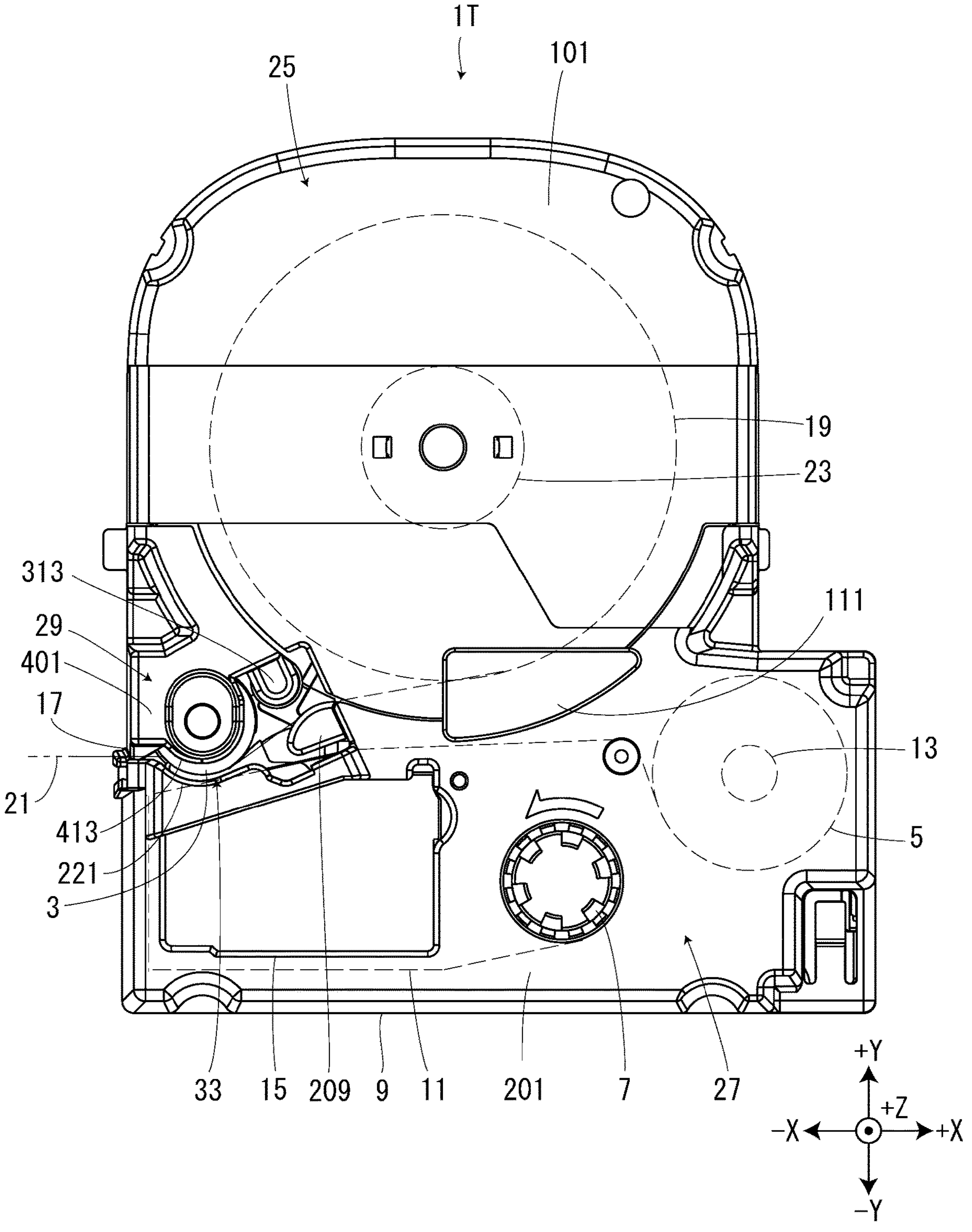
FIG. 2 is a view of a tape cartridge in which a tape roll is accommodated in the cartridge, viewed from the +Z direction.

As illustrated in FIGS. 1 and 2, the cartridge 1 is provided with a platen roller 3, a ribbon roll 5, a winding core 7, and a cartridge case 9 accommodating these components. The ribbon roll 5 is obtained by winding an ink ribbon 11 around a paying-out core 13. The ink ribbon 11 fed out from the paying-out core 13 is wound around the winding core 7. A head insertion hole 15 is provided through the cartridge case 9 in the Z axis. In addition, a tape feed port 17 extending in the Z axis is provided on a surface of the cartridge case 9 in the −X direction.

The cartridge 1 can accommodate the tape roll 19. Therefore, an operator can post-insert an original tape roll 19 into the cartridge 1. The operator means a person who performs work such as post-insertion of the tape roll 19, for example, the purchaser of the cartridge 1. The tape roll 19 is obtained by winding a tape 21 as a print medium around a tape core 23. The tape 21 fed out from the tape roll 19 is fed out of the cartridge case 9 from the tape feed port 17.

In the present embodiment, the cartridge 1 illustrated in FIG. 1 that does not accommodate the tape roll 19 is simply referred to as a “cartridge 1”, and the cartridge 1 illustrated in FIG. 2 that accommodates the tape roll 19 is simply referred to as a “tape cartridge 1T”. The tape cartridge 1T is mounted on the tape printer 501, and printing is performed on the tape 21 fed out from the mounted tape cartridge 1T.

Tape Printer

Figure 3:
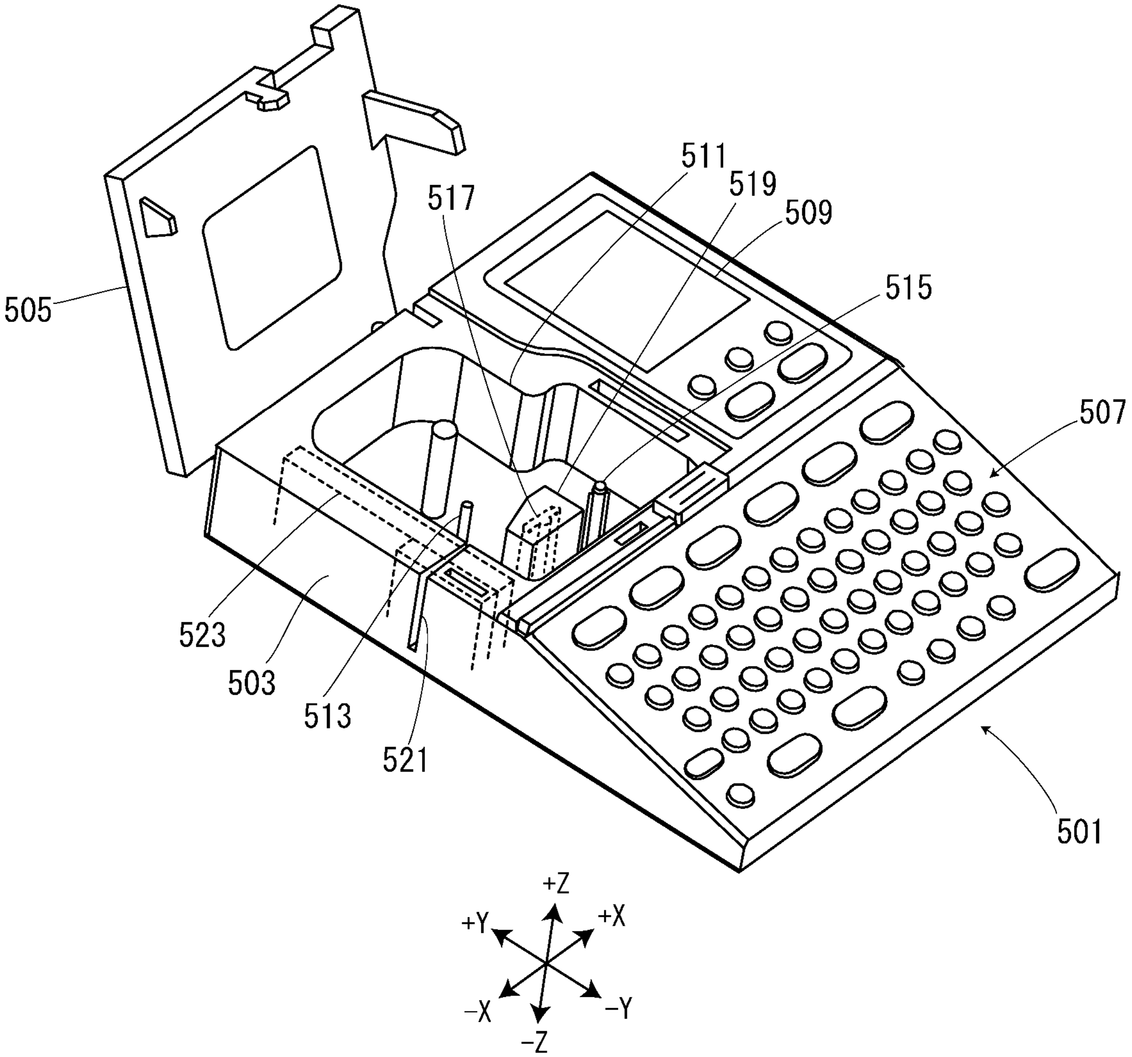
FIG. 3 is a perspective view of a tape printer.

As illustrated in FIG. 3, the tape printer 501 is provided with a device case 503 and a mounting portion cover 505. A keyboard 507, a display 509, and a cartridge mounting portion 511 are provided on a surface of the device case 503 in the +Z direction.

The keyboard 507 receives an input operation from the user. The display 509 displays input results from the keyboard 507 and various information.

The cartridge mounting portion 511 is formed in a recessed shape that is open in the +Z direction, and the tape cartridge 1T is attachably/detachably mounted thereon. Since the cartridge 1 is configured in the same manner as the tape cartridge 1T except that the tape roll 19 is not accommodated therein, the cartridge 1 can also be mounted on the cartridge mounting portion 511. However, since the cartridge 1 does not accommodate the tape roll 19 as the print medium, the tape cartridge 1T is normally mounted on the cartridge mounting portion 511.

The mounting portion cover 505 is rotatably attached to an end portion of the device case 503 in the +Y direction, and opens and closes the cartridge mounting portion 511.

A platen shaft 513 and a winding shaft 515 protrude in the +Z direction from a bottom surface of the cartridge mounting portion 511. When the tape cartridge 1T is mounted on the cartridge mounting portion 511, the platen shaft 513 is inserted into the platen roller 3, and the platen roller 3 and the platen shaft 513 are engaged with each other. As a result, rotation of a motor (not illustrated) can be transmitted to the platen roller 3 via the platen shaft 513. Similarly, when the tape cartridge 1T is mounted on the cartridge mounting portion 511, the winding shaft 515 is inserted into the winding core 7, and the winding core 7 and the winding shaft 515 are engaged with each other. As a result, the rotation of the motor can be transmitted to the winding core 7 via the winding shaft 515.

The cartridge mounting portion 511 is provided with a thermal head 517 and a head cover 519. The thermal head 517 is provided with heating elements (not illustrated) and prints on the tape 21. The head cover 519 partially covers the thermal head 517.

When the tape cartridge 1T is mounted on the cartridge mounting portion 511, the thermal head 517 and the head cover 519 are inserted through the head insertion hole 15. Subsequently, when the mounting portion cover 505 is closed, the thermal head 517 is moved toward the platen roller 3 by a head moving mechanism (not illustrated). As a result, the tape 21 and the ink ribbon 11 are pinched between the thermal head 517 and the platen roller 3. When the platen roller 3 rotates in this state, the tape 21 and the ink ribbon 11 are fed. At this time, the thermal head 517 generates heat to transfer the ink of the ink ribbon 11 to the tape 21, and the print image based on the input result from the keyboard 507 is printed on the tape 21.

A tape discharge port 521 is provided on a surface of the device case 503 in the −X direction. The printed tape 21 is discharged from the tape discharge port 521. A cutter 523 is provided between the cartridge mounting portion 511 and the tape discharge port 521. The cutter 523 cuts the tape 21. As a result, the printed portion of the tape 21 is cut away.

Cartridge Case

Figure 4:
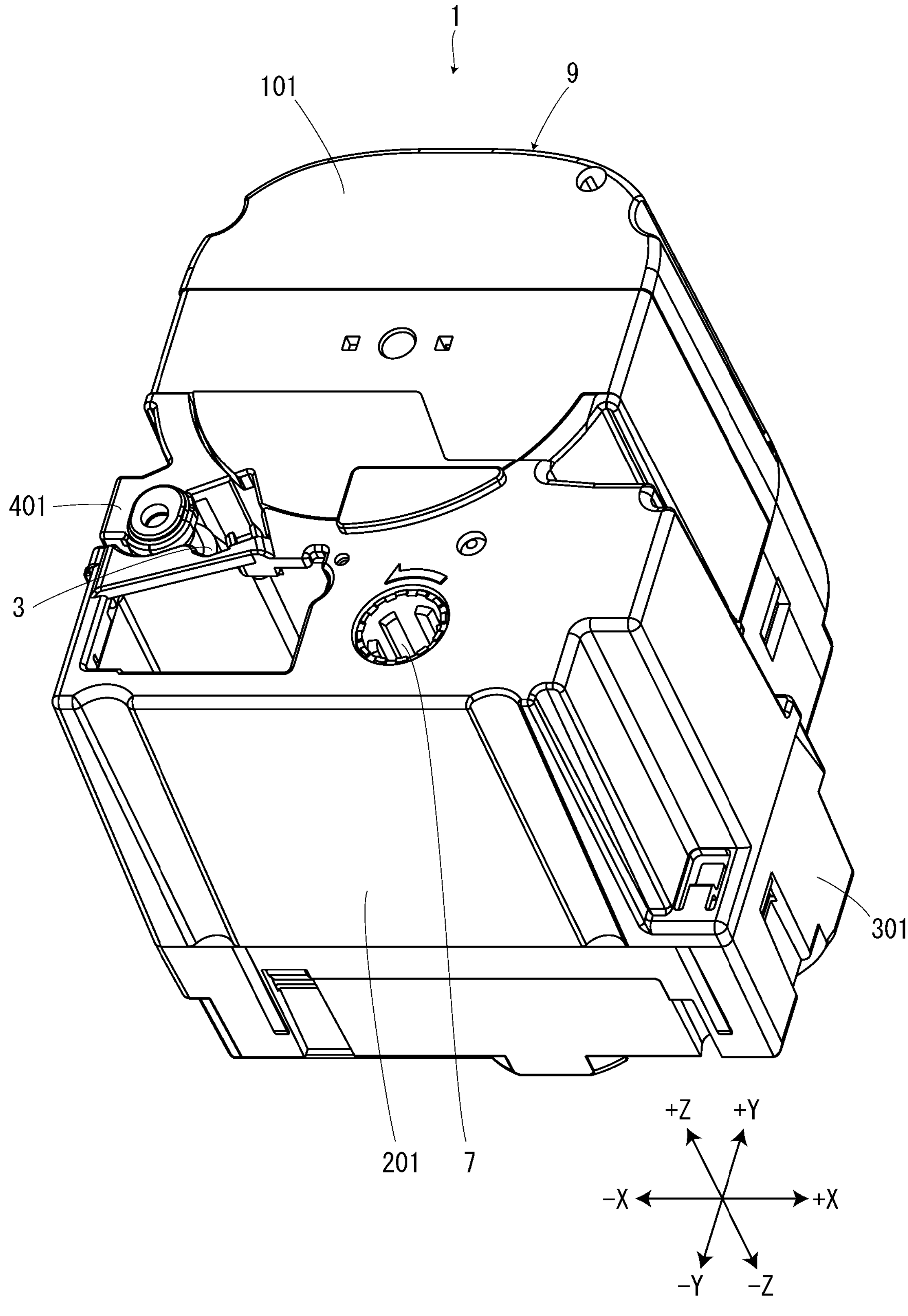
FIG. 4 is a perspective view of the cartridge.

As illustrated in FIGS. 1, 2 and 4, the cartridge case 9 is provided with a first case portion 101, a second case portion 201, a third case portion 301, and a fourth case portion 401. The first case portion 101, the second case portion 201, and the fourth case portion 401 are positioned in the +Z direction in the cartridge case 9, and the third case portion 301 is positioned in the −Z direction in the cartridge case 9. The tape cartridge 1T is mounted on the cartridge mounting portion 511 so that the third case portion 301 faces the bottom surface of the cartridge mounting portion 511. The tape cartridge 1T may be mounted on the cartridge mounting portion 511 so that the first case portion 101, the second case portion 201, and the fourth case portion 401 face the bottom surface of the cartridge mounting portion 511.

The first case portion 101, the second case portion 201, the third case portion 301, and the fourth case portion 401 are separate from each other. The first case portion 101, the second case portion 201, and the fourth case portion 401 are resin moldings having translucency, and the third case portion 301 is a resin molding having no translucency. However, the materials and manufacturing methods of the first case portion 101, the second case portion 201, the third case portion 301 and the fourth case portion 401 are not limited to these materials and manufacturing methods.

The first case portion 101 can accommodate the tape roll 19 between the first case portion 101 and the third case portion 301. That is, the first case portion 101 and the third case portion 301 constitute an outer shell of the tape roll accommodating portion 25. The tape roll 19 can be accommodated in the tape roll accommodating portion 25. By attaching the first case portion 101 to the third case portion 301, the tape roll accommodating portion 25 can be closed, and by removing the first case portion 101 from the third case portion 301, the tape roll accommodating portion 25 can be opened.

The second case portion 201 is provided in the −Y direction with respect to the first case portion 101. The second case portion 201 accommodates the ink ribbon 11 between the second case portion 201 and the third case portion 301. That is, the second case portion 201 and the third case portion 301 constitute an outer shell of the ink ribbon accommodating portion 27. The ribbon roll 5 and the winding core 7 are accommodated in the ink ribbon accommodating portion 27.

The fourth case portion 401 is provided between the first case portion 101 and the second case portion 201 at an end portion of the cartridge case 9 in the −X direction. The fourth case portion 401 accommodates the platen roller 3 between the fourth case portion 401 and the third case portion 301. That is, the third case portion 301 and the fourth case portion 401 constitute an outer shell of the platen roller accommodating portion 29. The platen roller 3 is accommodated in the platen roller accommodating portion 29.

The second case portion 201 is combined with the third case portion 301 by press-fitting a second engagement pin 219 illustrated in FIG. 10 into a third A engagement hole 335 illustrated in FIG. 6 (to be described later), it is difficult to manually remove the second case portion 201 from the third case portion 301. It is possible to remove the second case portion 201 from the third case portion 301 using a predetermined cartridge disassembling device. Similarly, the fourth case portion 401 is combined with the third case portion 301 by press-fitting a fourth engagement pin 411 illustrated in FIG. 12 into a third B engagement hole 337 illustrated in FIG. 6 (to be described later), it is difficult to manually remove the fourth case portion 401 from the third case portion 301. It is possible to remove the fourth case portion 401 from the third case portion 301 using the predetermined cartridge disassembling device.

Figure 5:
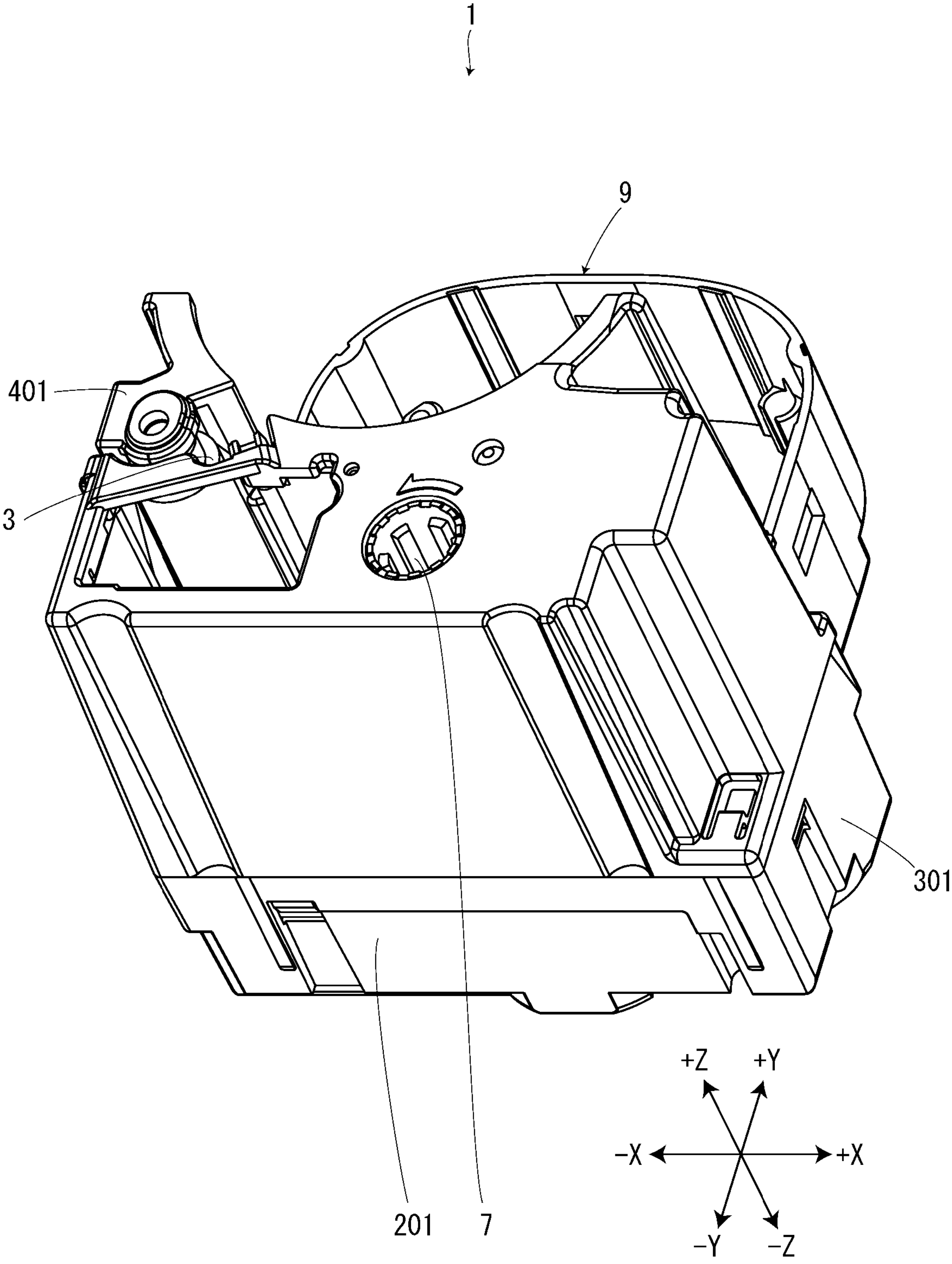
FIG. 5 is a perspective view of the cartridge from which a first case portion is removed.
Figure 8:
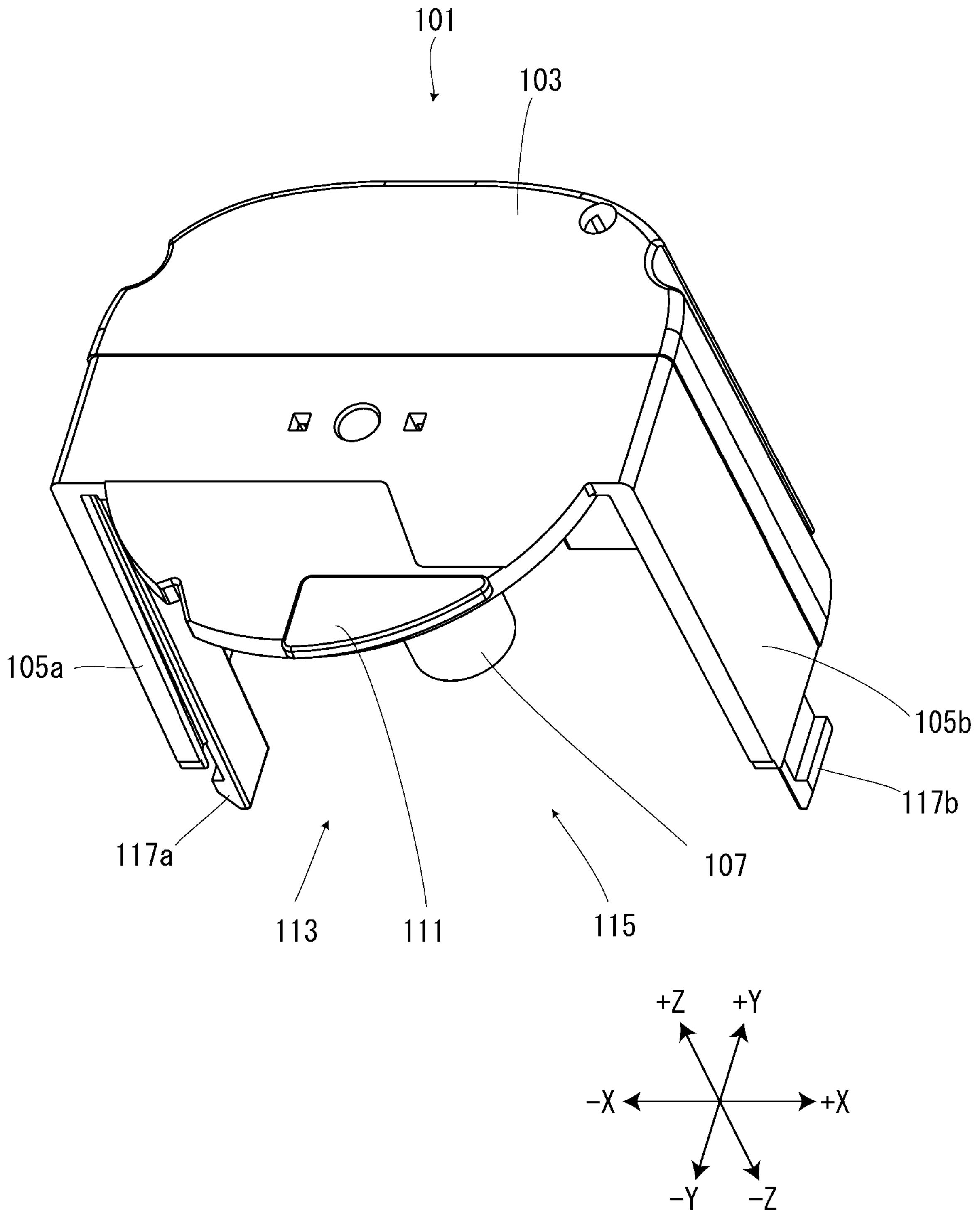
FIG. 8 is a perspective view of the first case portion.

On the other hand, as will be described later, the first case portion 101 is mounted by engaging a first A engagement projected portion 117*a*, a first B engagement projected portion 117*b*, and a first C engagement projected portion 117*c* provided in the first case portion 101 with a third A engagement receiving portion 333*a*, a third B engagement receiving portion 333*b*, and a third C engagement receiving portion 333*c* provided in the third case portion 301, respectively, as illustrated in FIG. 8. Therefore, as illustrated in FIG. 5, it is easy to manually remove the first case portion 101 from the third case portion 301. Therefore, the operator manually removes the first case portion 101 from the third case portion 301, accommodates the original tape roll 19 in the cartridge case 9 from which the first case portion 101 is removed, as illustrated in FIG. 5, and then mounts the first case portion 101 on the third case portion 301 again. Therefore, the operator can create the tape cartridge 1T in which the original tape roll 19 is accommodated.

Third Case Portion

Figure 6:
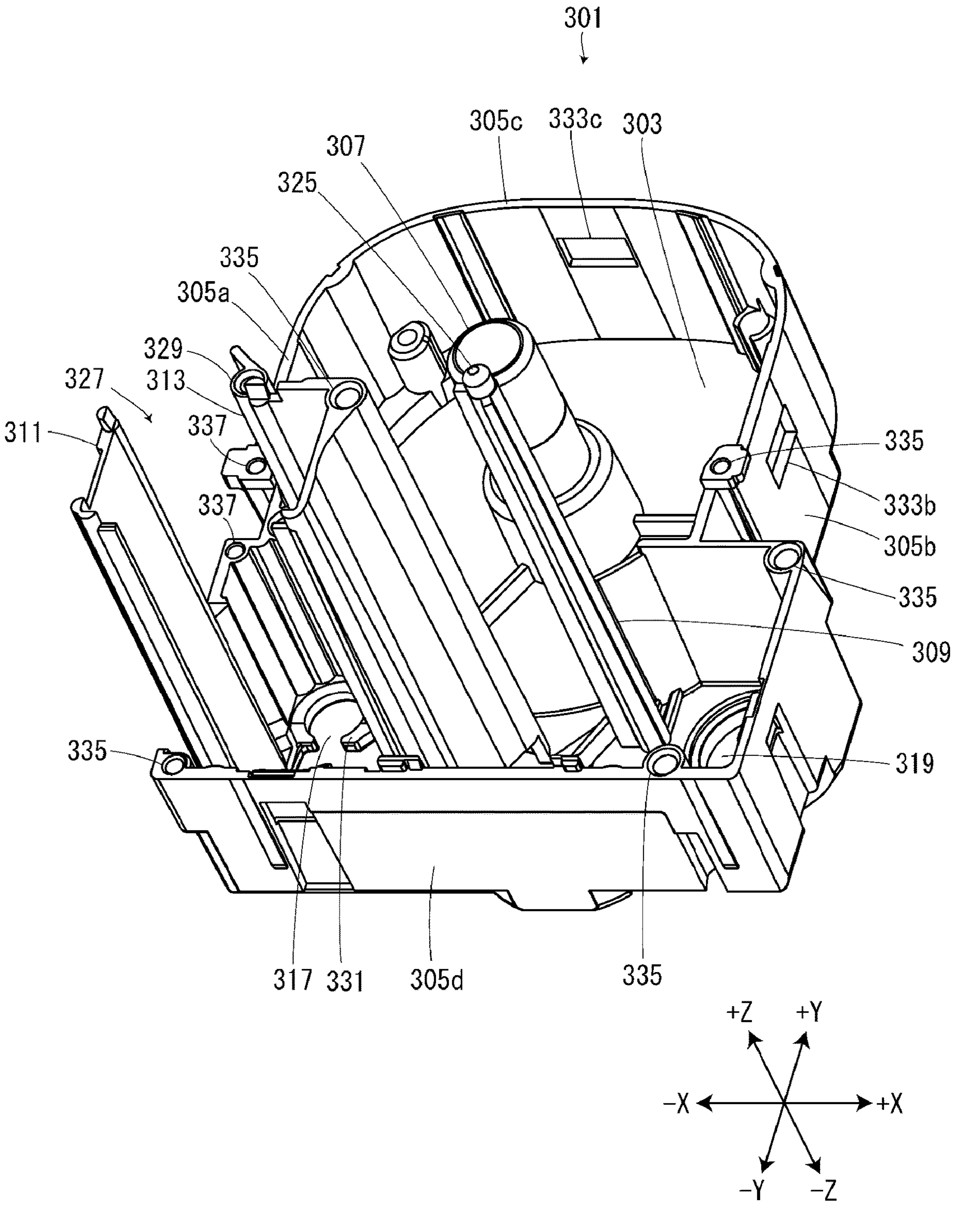
FIG. 6 is a perspective view of a third case portion.
Figure 7:
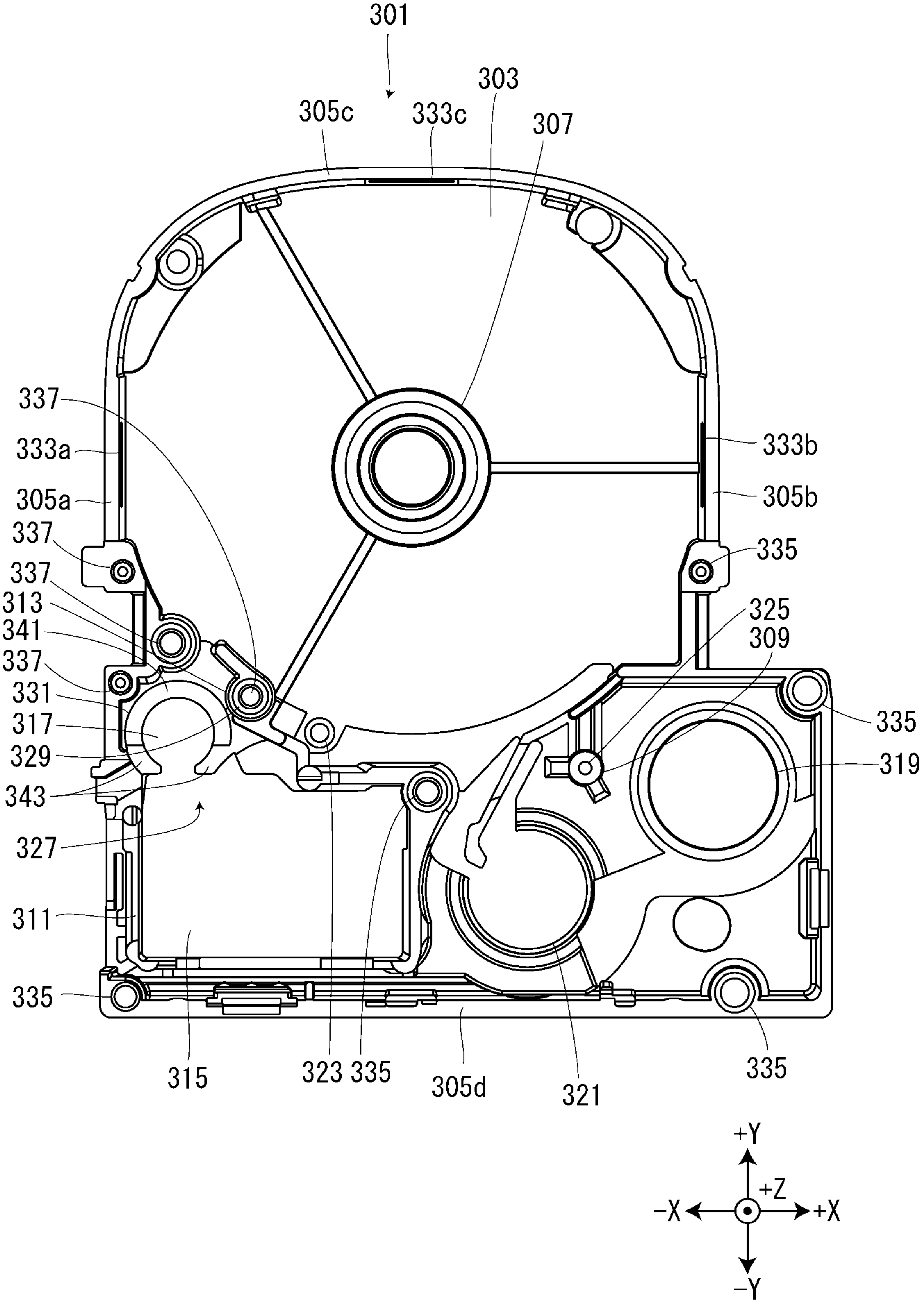
FIG. 7 is a view of the third case portion viewed from the +Z direction.

As illustrated in FIGS. 6 and 7, the third case portion 301 is provided with a third base wall portion 303 and a third side wall portion 305 protruding in the +Z direction from a peripheral edge portion of the third base wall portion 303.

The third base wall portion 303 is positioned in the −Z direction in the cartridge case 9. A third core protrusion 307, an A ribbon guide 309, a B ribbon guide 311, and an insertion guide 313 protrude from the third base wall portion 303 in the +Z direction. In addition, the third base wall portion 303 is provided with a third head opening 315, a platen opening 317, a paying-out opening 319, a third winding opening 321, and a tape guide engagement hole 323.

The third core protrusion 307 is formed in a substantially cylindrical shape. The third core protrusion 307 is inserted into the tape core 23 of the tape roll 19 from the −Z direction. That is, the third core protrusion 307 serves as the rotation shaft of the tape roll 19 together with a first core protrusion 107 described later.

The A ribbon guide 309 is provided in the −X direction with respect to the paying-out opening 319. The A ribbon guide 309 guides the feed of the ink ribbon 11 between the paying-out core 13 and the B ribbon guide 311. A ribbon guide engagement projected portion 325 is provided at an end portion of the A ribbon guide 309 in the +Z direction. The ribbon guide engagement projected portion 325 is engaged with a ribbon guide engagement hole 215 provided in the second base wall portion 203 of the second case portion 201 illustrated in FIG. 10. Therefore, the A ribbon guide 309 is supported on both sides by the third base wall portion 303 and the second base wall portion 203.

The B ribbon guide 311 is formed in a substantially square tubular shape at a peripheral edge portion of the third head opening 315. The B ribbon guide 311 constitutes a peripheral wall of the head insertion hole 15. The B ribbon guide 311 guides the feed of the ink ribbon 11 between the A ribbon guide 309 and the winding core 7 so that the ink ribbon 11 revolves around the head insertion hole 15. The B ribbon guide 311 has a part of the surface in the +Y direction that is open, and an opening portion thereof is referred to as a guide opening portion 327. When the tape cartridge 1T is mounted on the cartridge mounting portion 511, the thermal head 517 pinches the tape 21 and the ink ribbon 11 with the platen roller 3 via the guide opening portion 327.

The insertion guide 313 is positioned between the third core protrusion 307 and the platen opening 317 and provided near the platen opening 317. The insertion guide 313 guides the insertion of the tape 21 when the tape 21 pulled out from the tape roll 19 is inserted from a tape insertion port 33 described later as illustrated in FIG. 1 when the tape roll 19 is accommodated in the cartridge case 9. An insertion guide chamfered portion 329 is provided at an end portion of the insertion guide 313 in the +Z direction. As a result, when the tape 21 pulled out from the tape roll 19 is inserted from the tape insertion port 33, the tape 21 can be prevented from being caught by the insertion guide 313.

The third head opening 315 is formed in a substantially rectangular shape and provided at the corners of the third base wall portion 303 in the −X direction and the −Y direction. The third head opening 315 constitutes an end portion of the head insertion hole 15 in the −Z direction.

The platen opening 317 is formed in a substantially circular shape. An end portion of the platen opening 317 in the −Y direction is coupled to the third head opening 315. The platen opening 317 is engaged with an end portion of the platen roller 3 in the −Z direction. A third case-side roller engagement portion 331 is provided in a peripheral edge portion of the platen opening 317 so as to protrude in the +Z direction. The third case-side roller engagement portion 331 is formed in a substantially arc shape and is engaged with the end portion of the platen roller 3 in the −Z direction.

The paying-out opening 319 is formed in a substantially circular shape and is provided in the +X direction with respect to the third head opening 315. The paying-out opening 319 is engaged with an end portion of the paying-out core 13 in the −Z direction. The third winding opening 321 has a substantially circular shape and is provided between the third head opening 315 and the paying-out core 13. The third winding opening 321 is engaged with an end portion of the winding core 7 in the −Z direction.

The tape guide engagement hole 323 is provided in the +Y direction with respect to the third head opening 315. The tape guide engagement hole 323 is engaged with a tape guide engagement projected portion 217 provided in the tape guide 209.

The third side wall portion 305 protrudes in the +Z direction from the peripheral edge portion of the third base wall portion 303. Among the third side wall portions 305, a side wall portion in the −X direction is referred to as a third A side wall portion 305*a*, a side wall portion in the +X direction is referred to as a third B side wall portion 305*b*, a side wall portion in the +Y direction is referred to as a third C side wall portion 305*c*, and a side wall portion in the −Y direction is referred to as a third D side wall portion 305*d*. That is, in the third case portion 301, the third A side wall portion 305*a* and the third B side wall portion 305*b* are positioned opposite to each other, and the third C side wall portion 305*c* and the third D side wall portion 305*d* are positioned opposite to each other.

The third case portion 301 is provided with three third engagement receiving portions 333, five third A engagement holes 335, and four third B engagement holes 337.

Figure 9:
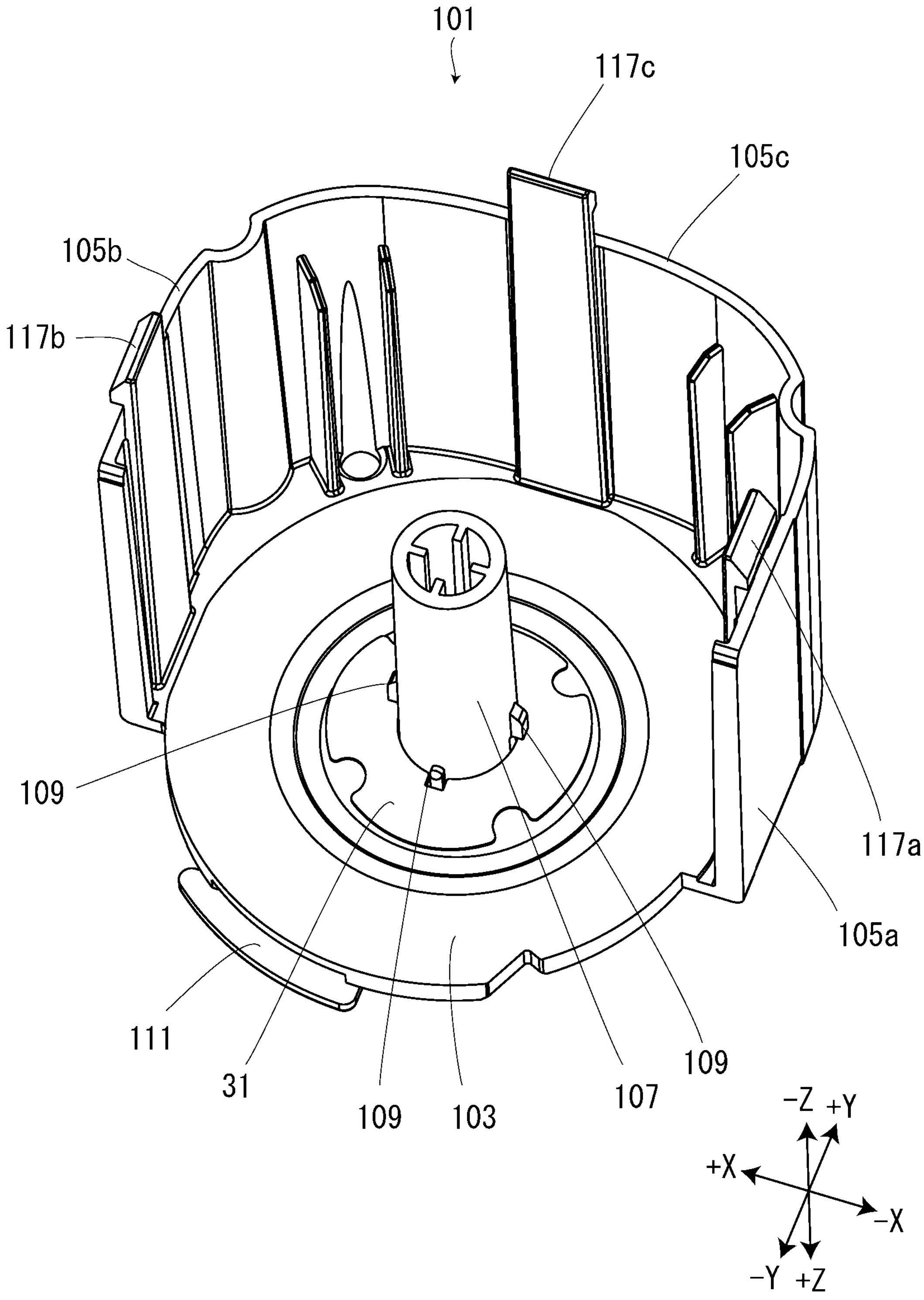
FIG. 9 is a perspective view of the first case portion viewed from an angle different from that of FIG. 8.

The three third engagement receiving portions 333, that is, a third A engagement receiving portion 333*a*, a third B engagement receiving portion 333*b*, and a third C engagement receiving portion 333*c*, are engaged with the three first engagement projected portions 117 provided in the first case portion 101, that is, a first A engagement projected portion 117*a*, a first B engagement projected portion 117*b*, and a first C engagement projected portion 117*c* illustrated in FIG. 9, respectively. As a result, the first case portion 101 is attachably/detachably mounted on the third case portion 301.

The five third A engagement holes 335 are provided corresponding to the positions where the second case portion 201 is mounted on the third case portion 301. Of the five third A engagement holes 335, four third A engagement holes 335 extend in the −Z direction from an end surface of the third side wall portion 305 in the +Z direction, and one third A engagement hole 335 extends in the −Z direction from an end surface of the B ribbon guide 311 in the +Z direction. The five second engagement pins 219 provided in the second case portion 201 are press-fitted into the five third A engagement holes 335 from the +Z direction. As a result, the second case portion 201 is combined with the third case portion 301.

The four third B engagement holes 337 are provided corresponding to the positions where the fourth case portion 401 is mounted on the third case portion 301. Of the four third B engagement holes 337, three third B engagement holes 337 are provided in the third side wall portion 305 and one third B engagement hole 337 is provided in the insertion guide 313. The four third B engagement holes 337 extend in the Z axis. Four fourth engagement pins 411 provided in the fourth case portion 401 are press-fitted into the four third B engagement holes 337 from the +Z direction. As a result, the fourth case portion 401 is combined with the third case portion 301.

First Case Portion

As illustrated in FIGS. 8 and 9, the first case portion 101 is provided with a first base wall portion 103 and a first side wall portion 105 protruding in the −Z direction from a peripheral edge portion of the first base wall portion 103.

The first base wall portion 103 is positioned in the +Z direction in the cartridge case 9. The first core protrusion 107 protrudes in the −Z direction from the first base wall portion 103. The first core protrusion 107 is formed in a substantially cylindrical shape. The first core protrusion 107 is inserted into the tape core 23 of the tape roll 19 from the +Z direction. That is, the first core protrusion 107 serves as the rotation shaft of the tape roll 19 together with the third core protrusion 307 described above.

A tape elastic portion 31 is provided at a base end portion of the first core protrusion 107, that is, an end portion in the +Z direction. As the tape elastic portion 31, for example, a disc spring, a compression coil spring, or the like can be used. The tape elastic portion 31 applies a load to the tape core 23 of the tape roll 19 accommodated in the cartridge case 9 in the width direction of the tape 21, that is, in the −Z direction. As a result, the tape core 23 is prevented from rattling when the tape 21 is fed, and the feeding of the tape 21 can be stabilized.

Four fixing portions 109 are provided at the base end portion of the first core protrusion 107. The four fixing portions 109 are provided at substantially equal intervals in the circumferential direction of the first core protrusion 107 and protrude radially from the outer peripheral surface of the first core protrusion 107. The tape elastic portion 31 is fixed to the base end portion of the first core protrusion 107 by four fixing portions 109. As a result, when the first case portion 101 is removed from the third case portion 301, the tape elastic portion 31 can be prevented from being removed from the first core protrusion 107, and the trouble of again attaching the tape elastic portion 31 to the first core protrusion 107 can be saved. The number of fixing portions 109 is not limited to four, and may be three or fewer, or five or more. In addition, a unit for fixing the tape elastic portion 31 to the base end portion of the first core protrusion 107 is not limited to providing the fixing portion 109. For example, a female thread is provided in the inner peripheral portion of the disc spring-like tape elastic portion 31, a male thread is provided in the outer peripheral portion of the first core protrusion 107, and the tape elastic portion 31 may be attached to the base end portion of the first core protrusion 107 by screwing. In addition, the tape elastic portion 31 may be fitted into, that is, fitted with the base end portion of the first core protrusion 107. In addition, the tape elastic portion 31 may be attached to the base end portion of the first core protrusion 107 using an adhesive.

An overlap portion 111 is provided at an edge portion of the first base wall portion 103 in the −Y direction. As illustrated in FIG. 1, the overlap portion 111 is a portion that overlaps the outside of the second base wall portion 203 of the second case portion 201, that is, in the +Z direction when the first case portion 101 is mounted on the third case portion 301. Since the overlap portion 111 is provided in the first base wall portion 103, even when a force is applied to the first base wall portion 103 from the outside, the first base wall portion 103 is prevented from bending inward, that is, in the −Z direction, and the tape roll 19 is prevented from being pushed by the first base wall portion 103 inward bent and being crushed in the width direction of the tape 21, that is, in the Z axis.

The first side wall portion 105 protrudes in the −Z direction from the peripheral edge portion of the first base wall portion 103. Among the first side wall portions 105, a side wall portion in the −X direction is referred to as a first A side wall portion 105*a*, a side wall portion in the +X direction is referred to as a first B side wall portion 105*b*, and a side wall portion in the +Y direction is referred to as a first C side wall portion 105*c*. That is, in the first case portion 101, the first A side wall portion 105*a* and the first B side wall portion 105*b* are positioned opposite to each other.

The surface of the first case portion 101 opposite to the first base wall portion 103, that is, the surface of the first case portion 101 in the −Z direction is open. That is, in the first case portion 101, a first opening portion 113 is provided in the direction from the first case portion 101 to the third case portion 301, that is, in the −Z direction. Since the first case portion 101 is provided with the first opening portion 113, when the first case portion 101 is mounted on the third case portion 301 after the tape roll 19 is accommodated in the cartridge case 9, it is possible to prevent from interfering between the first case portion 101 and the tape roll 19.

In addition, in the first case portion 101, the surface opposite to the first C side wall portion 105*c*, that is, the surface of the first case portion 101 in the −Y direction is open. That is, in the first case portion 101, a second opening portion 115 is provided in the direction from the first case portion 101 to the second case portion 201, that is, in the −Y direction. Since the first case portion 101 is provided with the second opening portion 115, it is possible to prevent the tape 21 fed from the tape roll 19 to the tape feed port 17 from interfering with the first case portion 101.

The first case portion 101 is provided with three first engagement projected portions 117, that is, a first A engagement projected portion 117*a*, a first B engagement projected portion 117*b*, and a first C engagement projected portion 117*c*. The first A engagement projected portion 117*a*, the first B engagement projected portion 117*b*, and the first C engagement projected portion 117*c* are engaged with the third A engagement receiving portion 333*a* and the third B engagement receiving portion provided in the third case portion 301. 333*b* and the third C engagement receiving portion 333*c*, respectively. As a result, the first case portion 101 is attachably/detachably mounted on the third case portion 301.

Second Case Portion

Figure 10:
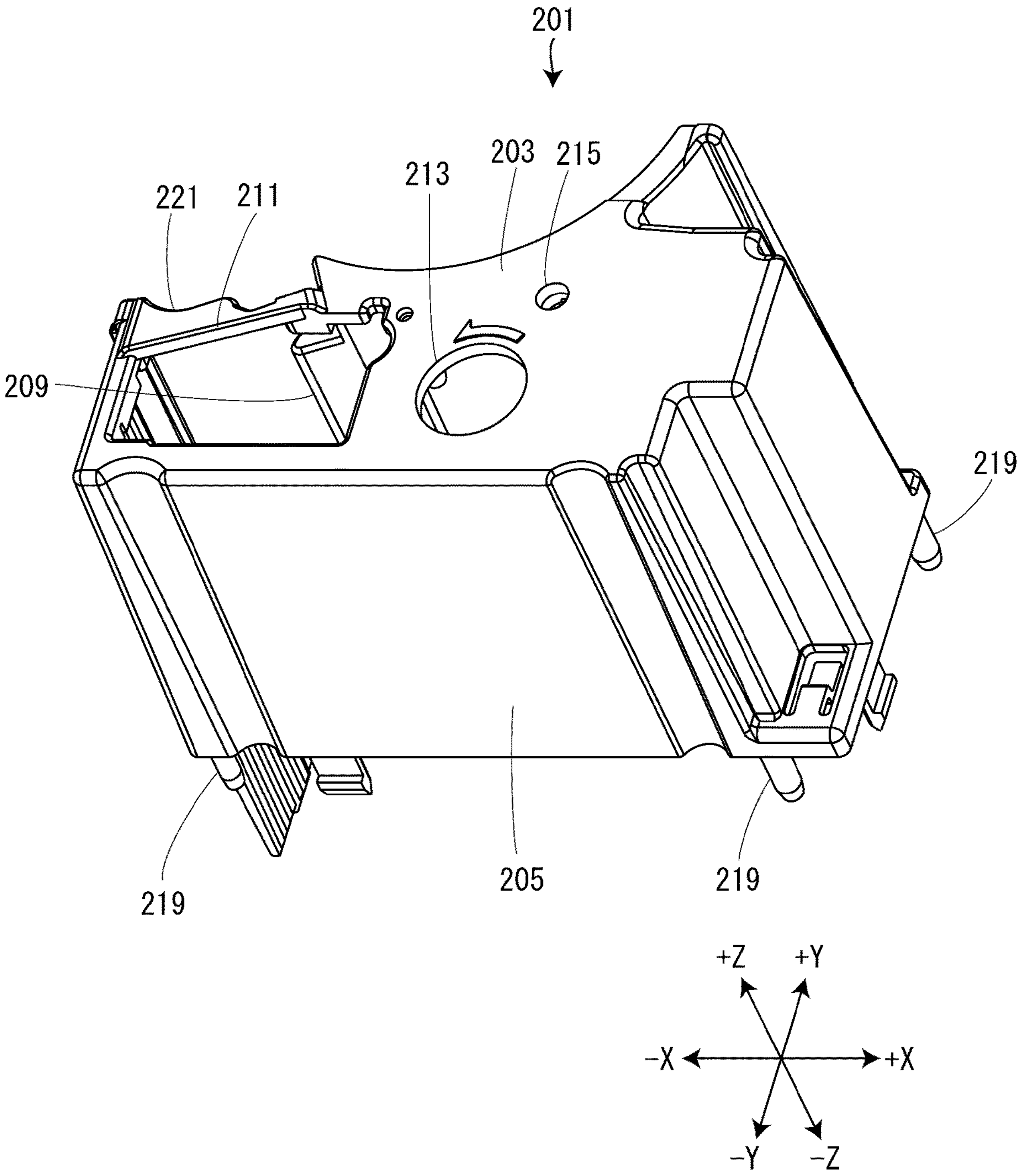
FIG. 10 is a perspective view of a second case portion.
Figure 11:
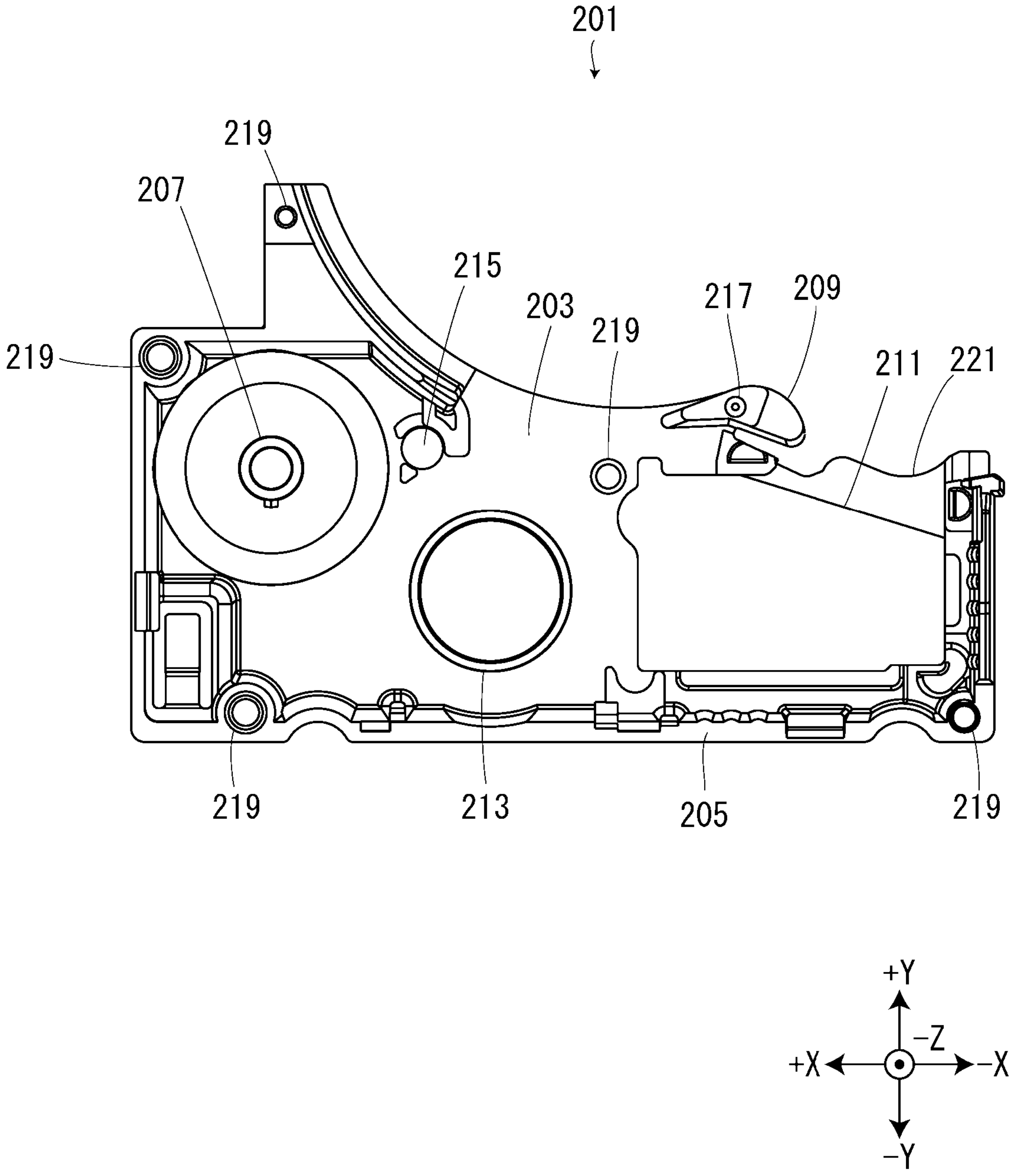
FIG. 11 is a view of the second case portion viewed from the −Z direction.

As illustrated in FIGS. 10 and 11, the second case portion 201 is provided with a second base wall portion 203 and a second side wall portion 205 protruding in the −Z direction from a peripheral edge portion of the second base wall portion 203.

The second base wall portion 203 is positioned in the +Z direction in the cartridge case 9. A second core protrusion 207 and a tape guide 209 protrude from the second base wall portion 203 in the −Z direction. In addition, the second base wall portion 203 is provided with a second head opening 211, a second winding opening 213, and a ribbon guide engagement hole 215.

The second core protrusion 207 is formed in a substantially cylindrical shape. The second core protrusion 207 is inserted into the paying-out core 13 from the +Z direction. That is, the second core protrusion 207 serves as the rotation shaft of the paying-out core 13. The second core protrusion 207 is provided with a ribbon elastic portion (not illustrated). As the ribbon elastic portion, for example, a disc spring, a compression coil spring, or the like can be used. The ribbon elastic portion applies a load in the width direction of the ink ribbon 11, that is, in the −Z direction, to the paying-out core 13. As a result, when the ink ribbon 11 is fed, the paying-out core 13 is prevented from rattling, and the feed of the ink ribbon 11 can be stabilized. Unlike the first case portion 101, since the second case portion 201 is normally not removed from the third case portion 301 except after the tape 21 and the ink ribbon 11 are exhausted, the second core protrusion 207 is not provided with a fixing portion for fixing the ribbon elastic portion.

The tape guide 209 guides the feed of the tape 21 between the tape roll 19 and the platen roller 3. The tape guide 209 is provided so as to face the insertion guide 313 as illustrated in FIG. 1, and the tape 21 inserted from the tape insertion port 33 is inserted between the tape guide 209 and the insertion guide 313. That is, the tape guide 209 is positioned in the −Z direction with respect to the tape insertion port 33. The tape guide engagement projected portion 217 is provided at the end portion of the tape guide 209 in the − direction. The tape guide engagement projected portion 217 is engaged with a tape guide engagement hole 323 illustrated in FIG. 7 provided in the third base wall portion 303 of the third case portion 301. Therefore, the tape guide 209 is supported on both sides by the second base wall portion 203 and the third base wall portion 303.

The second head opening 211 is formed in a substantially rectangular shape and provided at the corners of the second base wall portion 203 in the −X direction and the −Y direction. The third head opening 315 constitutes an end portion of the head insertion hole 15 in the +Z direction.

The second winding opening 213 is formed in a substantially circular shape and is provided in the +X direction with respect to the third head opening 315. The second winding opening 213 is engaged with the end portion of the winding core 7 in the +Z direction.

The ribbon guide engagement hole 215 is provided in the −X direction with respect to the second core protrusion 207. The ribbon guide engagement hole 215 is engaged with the ribbon guide engagement projected portion 325 provided in the A ribbon guide 309.

The second case portion 201 is provided with five second engagement pins 219. Of the five second engagement pins 219, four second engagement pins 219 protrude in the −Z direction from an end surface of the second side wall portion 205 in the −Z direction, and one second engagement pin 219 is positioned near the second head opening 211 and protrudes from the second base wall portion 203 in the −Z direction. The five second engagement pins 219 are press-fitted into the five third A engagement holes 335 provided in the third case portion 301 from the +Z direction. As a result, the second case portion 201 is combined with the third case portion 301.

Fourth Case Portion

Figure 12:
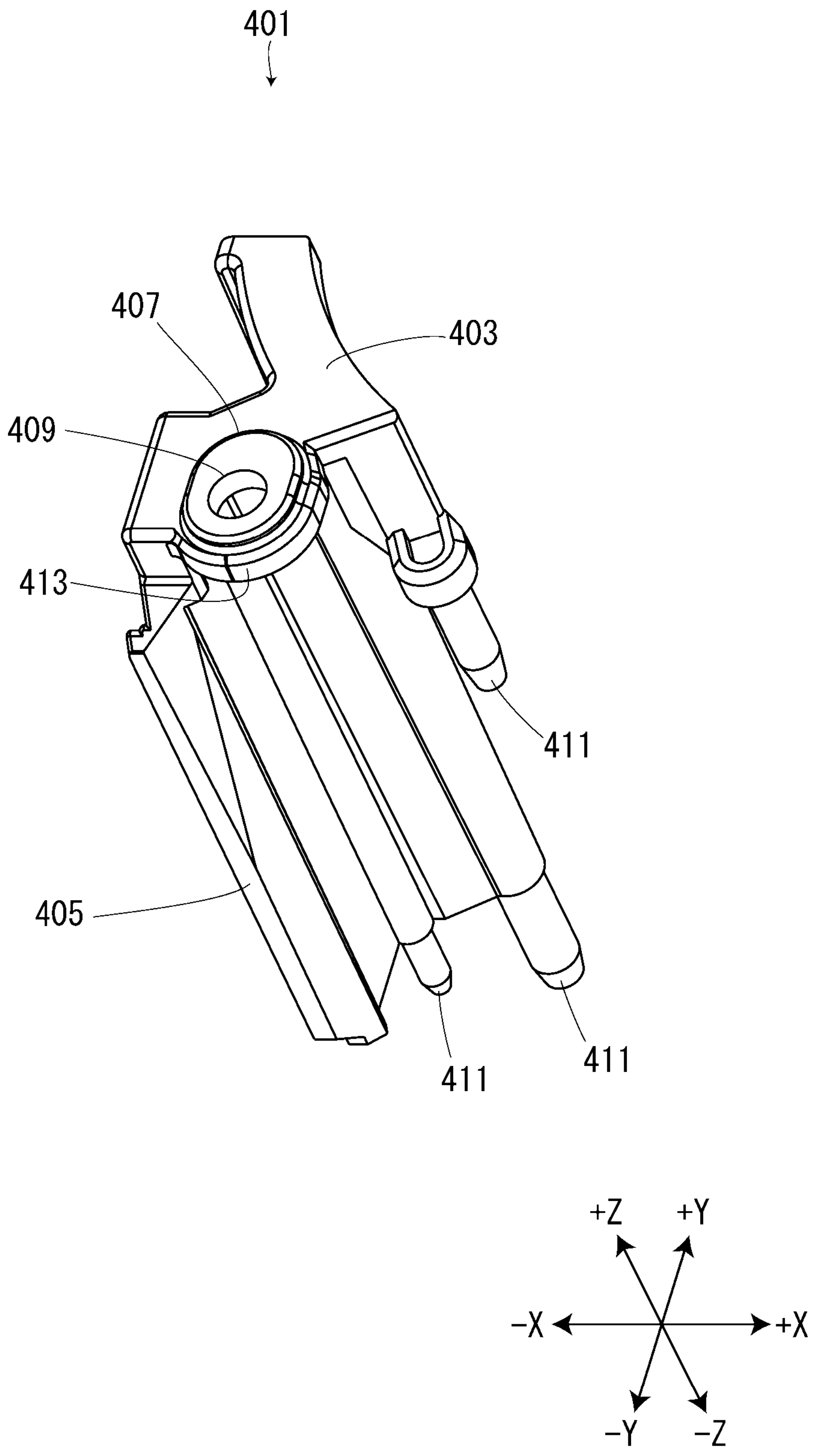
FIG. 12 is a perspective view of a fourth case portion.
Figure 13:
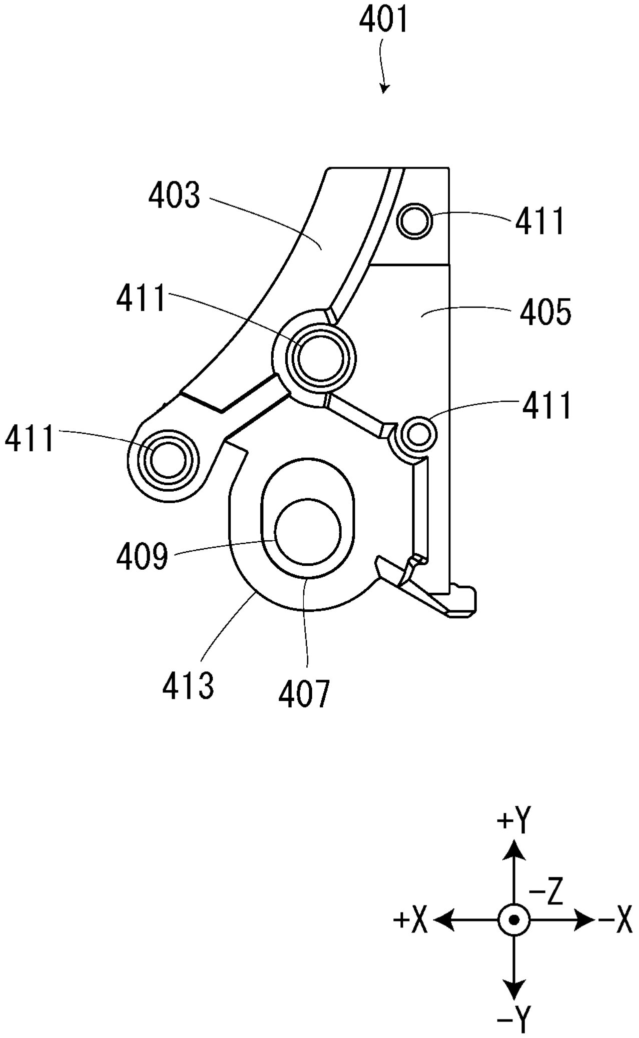
FIG. 13 is a view of the fourth case portion viewed from the −Z direction.

As illustrated in FIGS. 12 and 13, the fourth case portion 401 is provided with a fourth base wall portion 403 and a fourth side wall portion 405 protruding in the −Z direction from an edge portion of the fourth base wall portion 403 in the −X direction.

The fourth base wall portion 403 is positioned in the +Z direction in the cartridge case 9. The fourth base wall portion 403 is provided with a fourth case-side roller engagement portion 407. The fourth case-side roller engagement portion 407 is a recessed portion recessed in the +Z direction on the inner surface of the fourth base wall portion 403, that is, the surface in the −Z direction, and is formed in an oval shape elongated in the Y axis. The fourth case-side roller engagement portion 407 is engaged with the end portion of the platen roller 3 in the +Z direction. The fourth case-side roller engagement portion 407 is provided with a platen shaft insertion hole 409. A platen shaft 513 is inserted through the platen shaft insertion hole 409 when the tape cartridge 1T is mounted on the cartridge mounting portion 511.

Four fourth engagement pins 411 protrude from the fourth base wall portion 403 in the −Z direction. Of the four fourth engagement pins 411, three fourth engagement pins 411 protrude in the −Z direction from an end surface of the fourth side wall portion 405 in the −Z direction, and one fourth engagement pin 411 protrudes in the −Z direction from the fourth base wall portion 403. The four fourth engagement pins 411 are press-fitted into the four third B engagement holes 337 provided in the third case portion 301 from the +Z direction. As a result, the fourth case portion 401 is combined with the third case portion 301.

First Engagement Projected Portion and Third Engagement Receiving Portion

As illustrated in FIGS. 6 to 9, the first case portion 101 is provided with the first A engagement projected portion 117*a*, the first B engagement projected portion 117*b*, and the first C engagement projected portion 117*c* as described above. The first A engagement projected portion 117*a* protrudes in the −Z direction from the first A side wall portion 105*a*. The first B engagement projected portion 117*b* protrudes in the −Z direction from the first B side wall portion 105*b*. The first C engagement projected portion 117*c* protrudes in the −Z direction from the first C side wall portion 105*c*.

The first A engagement projected portion 117*a* has a hook-shaped tip end portion, and is engaged with the third A engagement receiving portion 333*a* of the third case portion 301 from the inside of the third case portion 301, that is, from the +X direction to −X direction. The first B engagement projected portion 117*b* has a hook-shaped tip end portion, and is engaged with the third B engagement receiving portion 333*b* of the third case portion 301 from the inside of the third case portion 301, that is, from the −X direction to +X direction. The first C engagement projected portion 117*c* has a hook-shaped tip end portion, and is engaged with the third C engagement receiving portion 333*c* of the third case portion 301 from the inside of the third case portion 301, that is, from the −Y direction to +Y direction.

The first A engagement projected portion 117*a*, the first B engagement projected portion 117*b*, and the first C engagement projected portion 117*c* are engaging with the third A engagement receiving portion 333*a*, the third B engagement receiving portion 333*b*, and the third C engagement receiving portion 333*c*, respectively. Therefore, the first case portion 101 is attachably/detachably mounted on the third case portion 301.

When the first case portion 101 is removed from the third case portion 301, the operator bends the first A side wall portion 105*a* and the first B side wall portion 105*b* inward by manually pinching the first case portion 101 in the X axis. As a result, the first A engagement projected portion 117*a* provided in the first A side wall portion 105*a* is removed from the third A engagement receiving portion 333*a* provided in the third case portion 301, and the first B engagement projected portion 117*b* provided in the first B side wall portion 105*b* is removed from the third B engagement receiving portion 333*b* provided in the third case portion 301. In this state, the operator rotates the first case portion 101 in the +Z direction, for example, using the end portion of the first C side wall portion 105*c* in the −Z direction as a fulcrum. As a result, the first C engagement projected portion 117*c* provided in the first C side wall portion 105*c* is removed from the third C engagement receiving portion 333*c* provided in the third case portion 301.

In this manner, the operator can remove only the first case portion 101 from the third case portion 301 among the first case portion 101 and the second case portion 201. That is, even when the first case portion 101 is removed from the third case portion 301, the second case portion 201 is attached to the third case portion 301, so the ribbon roll 5 remains accommodated between the second case portion 201 and the third case portion 301. Therefore, the operator can post-insert the tape roll 19 into the cartridge case 9 without unraveling the ribbon roll 5.

In addition, since the first A side wall portion 105*a* and the first B side wall portion 105*b* are provided on sides of the first case portion 101 opposite to each other, the operator can easily perform an operation to bend the first A side wall portion 105*a* and the first B side wall portion 105*b* inward. Therefore, the operator can easily remove the first A engagement projected portion 117*a* provided in the first A side wall portion 105*a* and the first B engagement projected portion 117*b* provided in the first B side wall portion 105*b* from the third A engagement receiving portion 333*a* and the third B engagement receiving portion 333*b*, respectively.

In addition, when the first case portion 101 is mounted on the third case portion 301, the operator bends the first A side wall portion 105*a* and the first B side wall portion 105*b* inward by manually pinching the first case portion 101 in the X axis. In this state, the operator matches the first side wall portion 105 of the first case portion 101 and the third side wall portion 305 of the third case portion 301, and engages the first C engagement projected portion 117*c* with the third C engagement receiving portion 333*c* from the inside of the third case portion 301. Thereafter, the operator loosens the force that pinches the first case portion 101. As a result, the first A engagement projected portion 117*a* provided in the first A side wall portion 105*a* engages with the third A engagement receiving portion 333*a* from the inside of the third case portion 301, and the first B engagement projected portion 117*b* provided in the first B side wall portion 105*b* is engaged with the third B engagement receiving portion 333*b* from the inside of the third case portion 301.

In this manner, the first A side wall portion 105*a* provided with the first A engagement projected portion 117*a* and the first B side wall portion 105*b* provided with the first B engagement projected portion 117*b* are provided on the sides of the first case portion 101 opposite to each other. As a result, the operator can easily perform an operation to bend the first A side wall portion 105*a* and the first B side wall portion 105*b* inward in order to remove the first A engagement projected portion 117*a* and the first B engagement projected portion 117*b* from the third A engagement receiving portion 333*a* and the third B engagement receiving portion 333*b*, respectively.

Tape Insertion Port

As illustrated in FIG. 1, a tape insertion port 33 is provided on a surface of the cartridge case 9 in the +Z direction. The tape insertion port 33 is provided between the second case portion 201 and the fourth case portion 401. The end portion of the tape insertion port 33 in the −X direction is coupled to the tape feed port 17 via a tape introduction path 35 illustrated in FIG. 14 described later.

When post-inserting the original tape roll 19 into the cartridge case 9, for example, the operator holds the tape roll 19 with one hand and pulls out the tape 21 from the tape roll 19 with the other hand so that the leading edge of the tape 21 comes out of the cartridge case 9 from the tape feed port 17. Subsequently, the operator places the tape roll 19 on the third base wall portion 303 so that the third core protrusion 307 is inserted into the tape core 23 of the tape roll 19, and inserts the tape 21 pulled out from the tape roll 19 into the tape insertion port 33 in the −Z direction from one end portion of the tape 21 in the width direction, that is, the end portion in the −Z direction. The tape 21 inserted from the tape insertion port 33 is inserted between the ink ribbon 11 and the platen roller 3.

In this manner, the operator can accommodate the tape roll 19 in the cartridge case 9 in a state where the leading edge of the tape 21 came out of the cartridge case 9 from the tape feed port 17, without the troublesome task of manually rotating the tape roll 19 to feed the tape 21 to the tape feed port 17.

An edge portion of the tape insertion port 33 in the −Y direction is referred to as a second insertion edge portion 221, and an edge portion of the tape insertion port 33 in the +Y direction is referred to as a fourth insertion edge portion 413. The second insertion edge portion 221 is configured to include the second base wall portion 203 of the second case portion 201. The fourth insertion edge portion 413 is configured to include the fourth base wall portion 403 of the fourth case portion 401.

The second insertion edge portion 221 is formed in an arc shape that projects toward a side opposite to the platen roller 3 with respect to the second insertion edge portion 221, that is, an arc shape that projects in the −Y direction. Therefore, the shape of the tape 21 inserted from the tape insertion port 33 can be formed into a shape curved in accordance with the outer peripheral surface of the platen roller 3 which is projected in the −Y direction. As a result, it is possible to prevent the tape 21 from being caught on the platen roller 3 when the tape 21 is inserted from the tape insertion port 33.

Tape Feed Port and Tape Introduction Path

Figure 14:
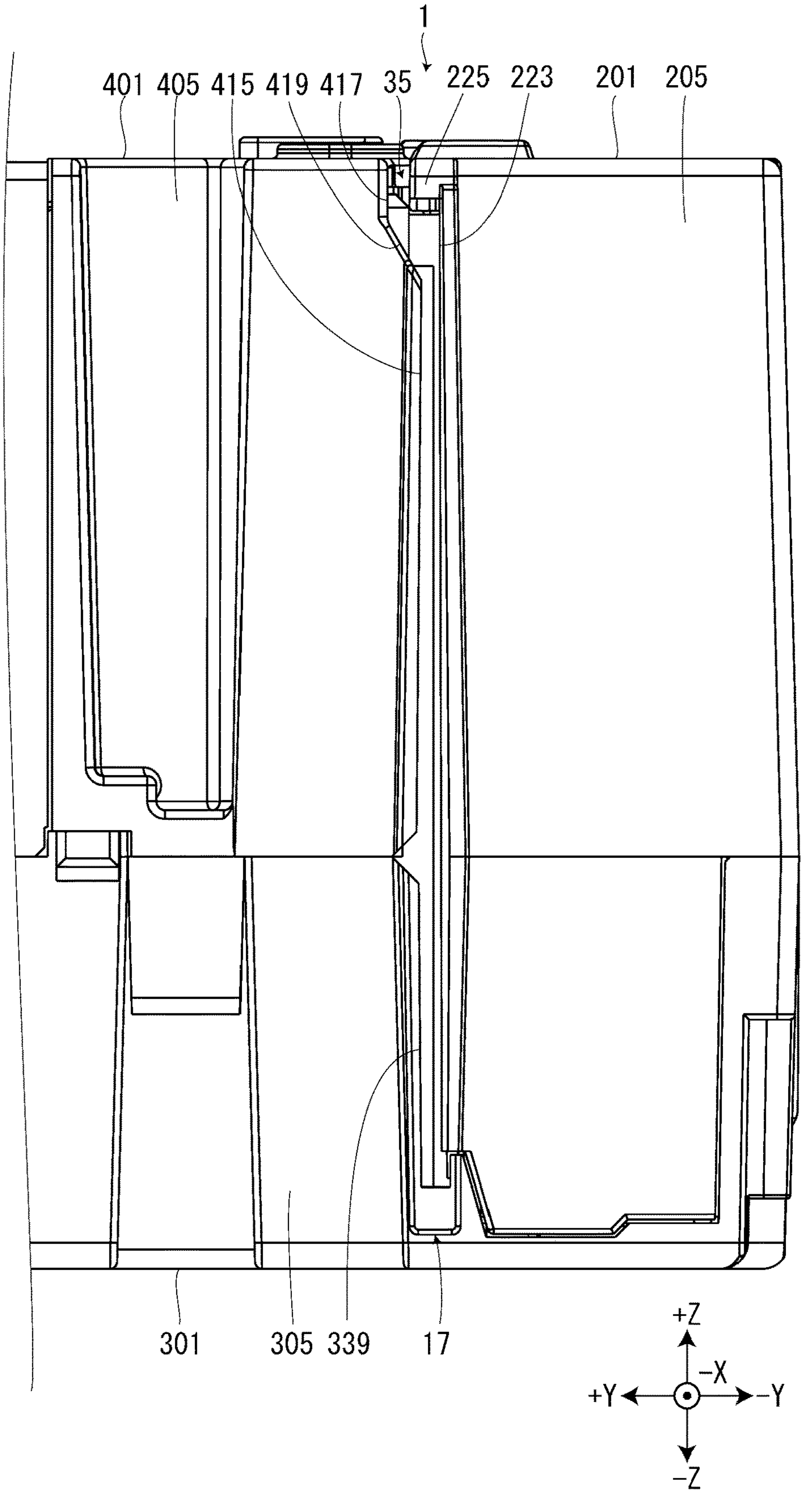
FIG. 14 is a view of the cartridge viewed from the −X direction.

As illustrated in FIG. 14, a tape feed port 17 and a tape introduction path 35 are provided on a surface of the cartridge case 9 in the −X direction.

The tape 21 fed out from the tape roll 19 is fed out of the cartridge case 9 from the tape feed port 17. The tape feed port 17 is formed in a substantially rectangular shape elongated in the Z axis. Approximately half of the tape feed port 17 in the +Z direction is provided between the second case portion 201 and the fourth case portion 401, and approximately half of the tape feed port 17 in the −Z direction is provided between the second case portion 201 and the third case portion 301.

An edge portion of the tape feed port 17 in the −Y direction is referred to as a second feed edge portion 223. The second feed edge portion 223 is formed by the second side wall portion 205 of the second case portion 201. The second feed edge portion 223 extends in the Z axis. A feed projected portion 225 is provided at an end portion of the second feed edge portion 223 in the +Z direction.

The feed projected portion 225 protrudes from the second feed edge portion 223 toward a facing edge portion 417 described later, that is, in the +Y direction. The feed projected portion 225 is provided so as to block the +Z direction of the tape feed port 17. The feed projected portion 225 can prevent the tape 21 from coming out of the tape feed port 17 in the +Z direction. In addition, when the tape 21 is fed, the feed projected portion 225 can prevent the tape 21 from meandering or skewing in the +Z direction.

Among the edge portions of the tape feed port 17 in the +Y direction, a portion formed by the third side wall portion 305 of the third case portion 301 is referred to as a third feed edge portion 339, and a portion formed by the fourth side wall portion 405 of the fourth case portion 401 is referred to as a fourth feed edge portion 415. The third feed edge portion 339 extends in the Z axis. The fourth feed edge portion 415 is provided in the +Z direction with respect to the third feed edge portion 339. The fourth feed edge portion 415 extends in the Z axis.

The tape introduction path 35 introduces the tape 21 inserted from the tape insertion port 33 to the tape feed port 17. The tape introduction path 35 couples an end portion of the tape insertion port 33 in the −X direction and the +Y direction side of an end portion of the tape feed port 17 in the +Z direction. That is, the end portion of the tape introduction path 35 in the +Z direction is coupled to the end portion of the tape insertion port 33 in the −X direction, and the end portion of the tape introduction path 35 in the −Y direction is coupled to the +Y direction side of the end portion of the tape feed port 17 in the +Z direction.

A facing edge portion 417 and an inclined edge portion 419 are provided at the edge portion of the tape introduction path 35 in the +Y direction. The facing edge portion 417 and the inclined edge portion 419 are formed by the fourth side wall portion 405 of the fourth case portion 401. The facing edge portion 417 extends in the Z axis and faces the feed projected portion 225. When the tape 21 is inserted from the tape insertion port 33, the tape 21 is inserted from between the feed projected portion 225 and the facing edge portion 417 in the tape introduction path 35.

The inclined edge portion 419 is provided between the facing edge portion 417 and the fourth feed edge portion 415. The inclined edge portion 419 is inclined with respect to the facing edge portion 417 so as to introduce the tape 21 inserted from between the feed projected portion 225 and the facing edge portion 417 to the tape feed port 17. That is, an end portion of the inclined edge portion 419 in the −Z direction is positioned in the −Y direction with respect to an end portion of the inclined edge portion 419 in the +Z direction. When the tape 21 is inserted from between the feed projected portion 225 and the facing edge portion 417, the end portion of the tape 21 in the −Z direction hits the inclined edge portion 419. The tape 21 that hits the inclined edge portion 419 is introduced from the tape introduction path 35 to the tape feed port 17 by the inclined edge portion 419 inclined with respect to the facing edge portion 417. Therefore, the operator can easily insert the tape 21 pulled out from the tape roll 19 into the tape feed port 17 from the tape insertion port 33.

The width of the tape introduction path 35, that is, an interval between the feed projected portion 225 and the facing edge portion 417, is wider than the width of the tape feed port 17, that is, an interval between the second feed edge portion 223 and the fourth feed edge portion 415. Therefore, when the tape 21 is inserted from the tape insertion port 33, even when the tape 21 is thicker than a normal tape 21, the tape 21 can be easily inserted between the feed projected portion 225 and the facing edge portion 417.

In addition, when the tape 21 pulled out from the tape roll 19 accommodated in the cartridge case 9 is taken out from the tape insertion port 33 for replacement of the tape roll 19 or the like, one end portion of the tape 21 in the +Z direction, which is one end portion in the width direction, is passed between the feed projected portion 225 and the facing edge portion 417. In the present embodiment, since the inclined edge portion 419 is inclined with respect to the facing edge portion 417, the end portion of the tape 21 in the +Z direction is slightly bent, so that the end portion of the tape 21 in the +Z direction can be passed between the feed projected portion 225 and the facing edge portion 417. Therefore, the operator can easily take out the tape 21 pulled out from the tape roll 19 accommodated in the cartridge case 9 from the tape insertion port 33.

Platen Roller and Third Case-Side Roller Engagement Portion

Figure 15:
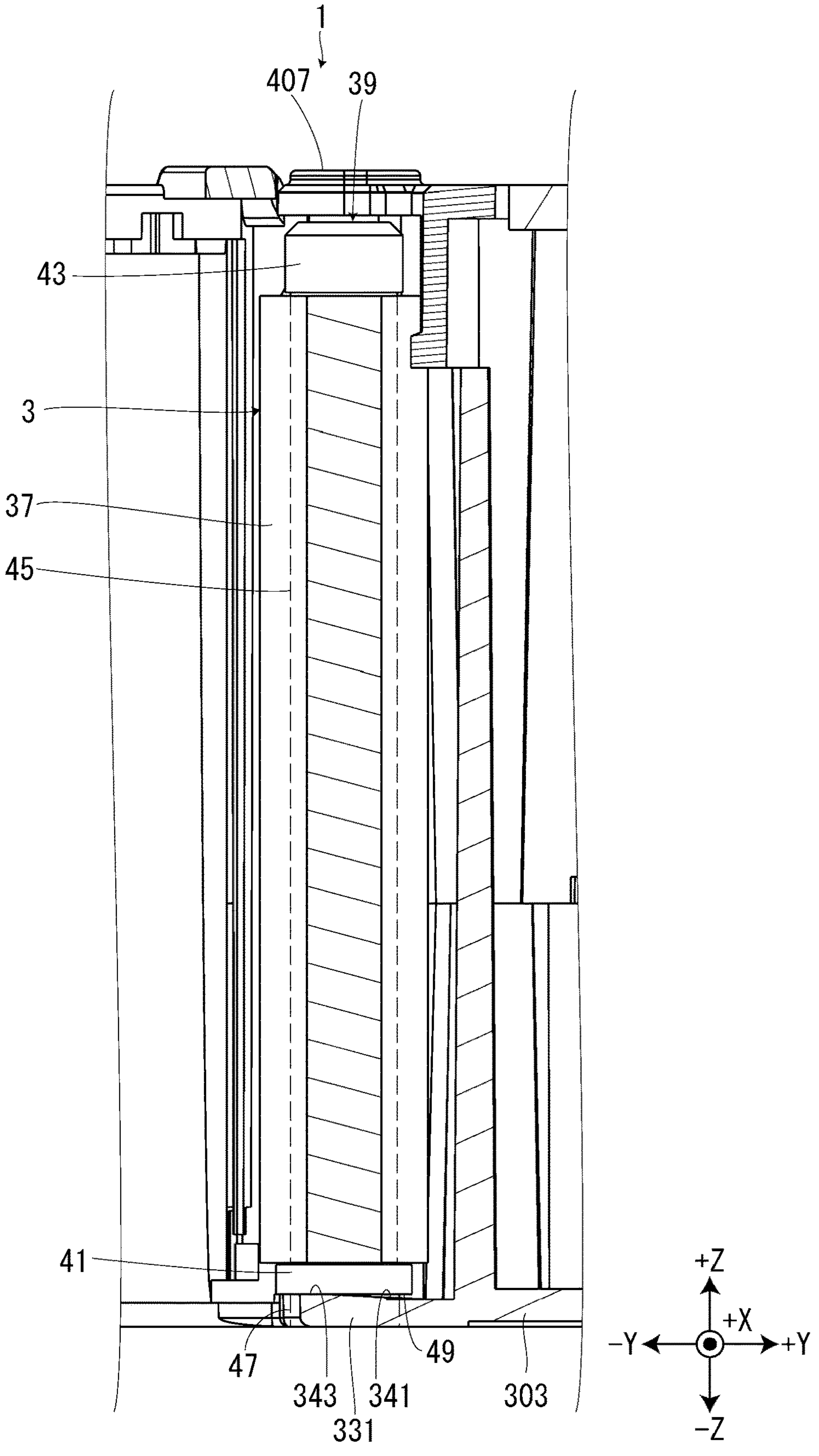
FIG. 15 is a cross-sectional view of the cartridge illustrating a structure around a platen roller.

As illustrated in FIG. 15, the platen roller 3 has a roller main body 37 and a roller shaft 39. The roller main body 37 is made of an elastic material such as rubber, and is formed in a substantially cylindrical shape. The roller main body 37 is mounted on the outer peripheral surface of the roller shaft 39.

The roller shaft 39 is made of resin, for example, and is formed in a substantially cylindrical shape. The roller shaft 39 is provided with a first roller-side engagement portion 41 and a second roller-side engagement portion 43. The first roller-side engagement portion 41 is provided near the end portion of the roller shaft 39 in the −Z direction, and the second roller-side engagement portion 43 is provided at the end portion of the roller shaft 39 in the +Z direction. A portion of the roller shaft 39 between the first roller-side engagement portion 41 and the second roller-side engagement portion 43 is referred to as a roller mounting portion 45. The roller main body 37 is mounted on the outer peripheral surface of the roller mounting portion 45. In addition, a portion of the roller shaft 39 positioned in the −Z direction with respect to the first roller-side engagement portion 41 is referred to as an opening insertion portion 47. The opening insertion portion 47 is inserted into the platen opening 317.

The first roller-side engagement portion 41 is formed to have a larger diameter than that of the roller mounting portion 45 or the opening insertion portion 47. The first roller-side engagement portion 41 is engaged with the third case-side roller engagement portion 331. A surface of the first roller-side engagement portion 41 in the −Z direction is referred to as a first roller-side contact surface 49. The first roller-side contact surface 49 is in contact with a surface of the third case-side roller engagement portion 331 in the +Z direction.

The second roller-side engagement portion 43 is formed to have a larger diameter than that of the roller mounting portion 45. The second roller-side engagement portion 43 is engaged with the fourth case-side roller engagement portion 407. As described above, the fourth case-side roller engagement portion 407 is formed in an oval shape elongated in the Y axis. Therefore, the platen roller 3 can take an upright first posture illustrated in FIG. 16 and a second posture inclined with respect to the first posture illustrated in FIG. 17, so that the end portion of the platen roller 3 in the +Z direction is farther from the ink ribbon 11 in the +Y direction than the end portion of the platen roller 3 in the −Z direction. The first posture in which the platen roller 3 stands upright means a posture in which the axial direction of the platen roller 3 is substantially parallel to the width direction of the ink ribbon 11, that is, the Z axis.

Figure 16:
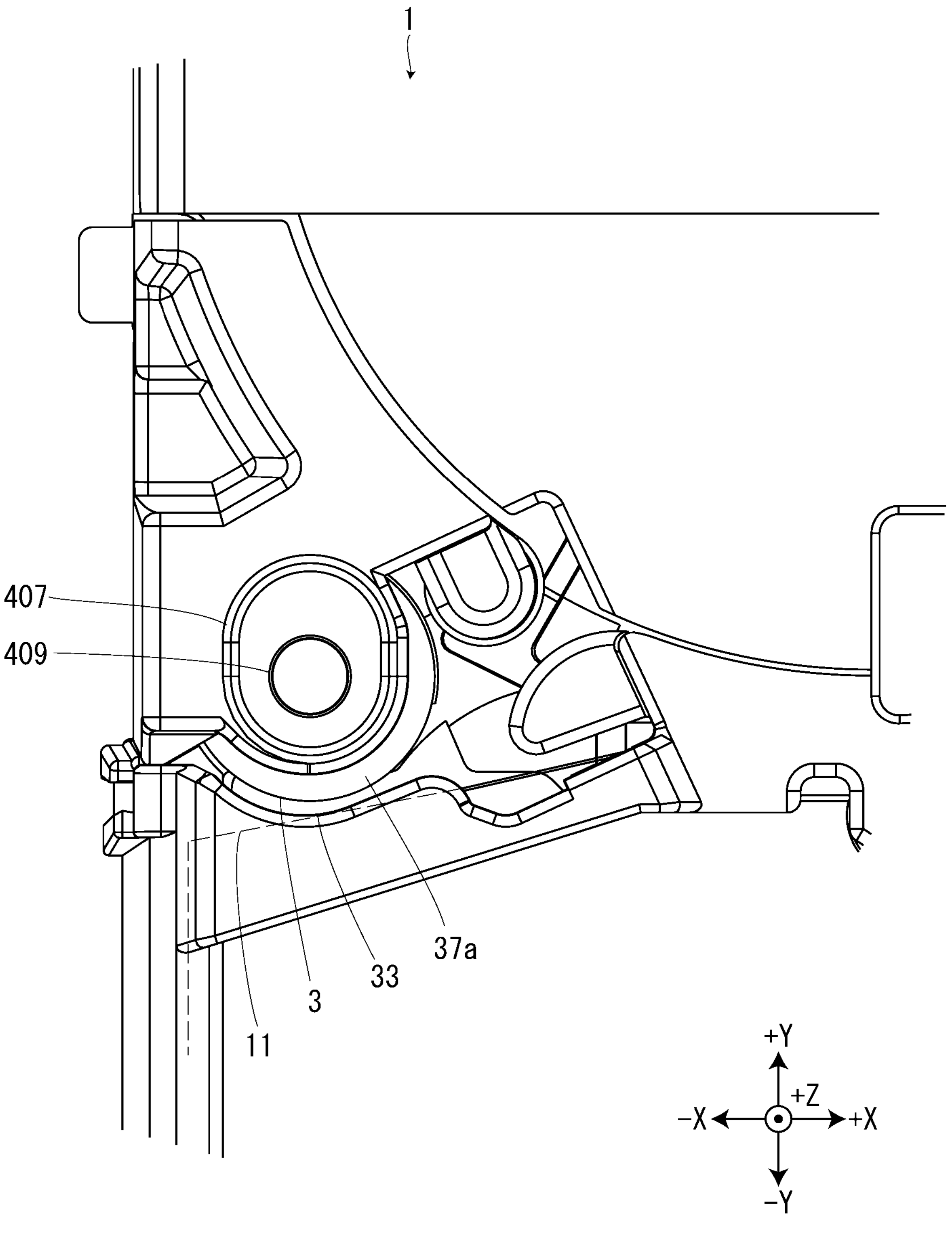
FIG. 16 is a view illustrating the platen roller in a first posture.
Figure 17:
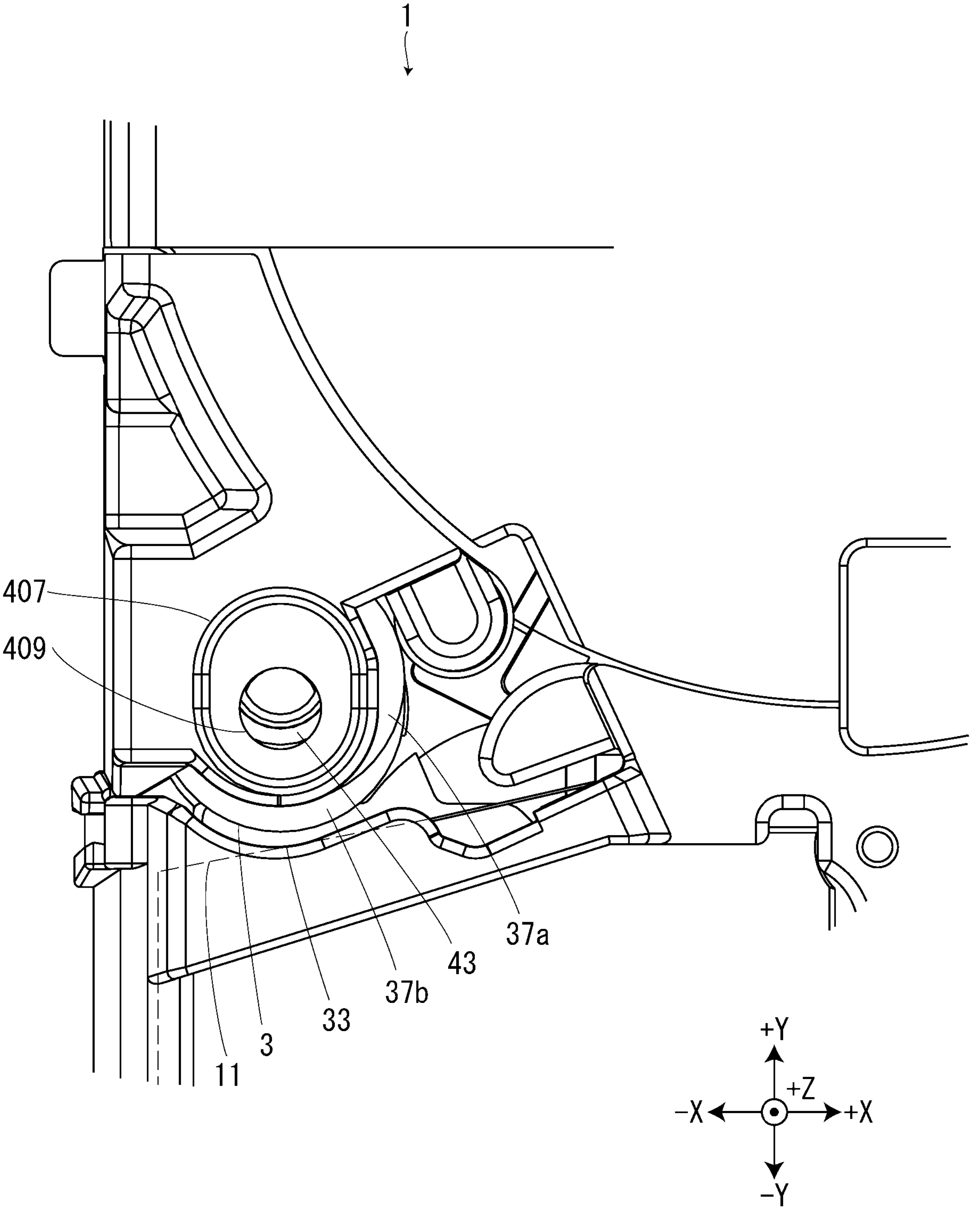
FIG. 17 is a view illustrating the platen roller in a second posture.

As illustrated in FIGS. 16 and 17, when the platen roller 3 stands upright and is in the first posture, and the cartridge 1 is viewed from the +Z direction, an end surface 37*a* of the roller main body 37 in the +Z direction can be seen through the tape insertion port 33. On the other hand, when the platen roller 3 is inclined and is in the second posture, and the cartridge 1 is viewed from the +Z direction, not only the end surface 37*a* of the roller main body 37 in the +Z direction but also the outer peripheral surface 37*b* of the roller main body 37 can be seen through the tape insertion port 33, and the second roller-side engagement portion 43 can be seen through the platen shaft insertion hole 409.

A first contact surface 341 and a second contact surface 343 are provided on a surface of the third case-side roller engagement portion 331 in the +Z direction. As illustrated in FIG. 7, the first contact surface 341 is formed in an arc shape having a central angle larger than that of a semicircle when viewed from the +Z direction. The first contact surface 341 is inclined to the XY plane. That is, an end portion of the first contact surface 341 in the +Y direction is positioned in the −Z direction from an end portion of the first contact surface 341 in the −Y direction. The second contact surface 343 is provided in the −Y direction with respect to the first contact surface 341, and is formed in two arc shapes having a smaller central angle than that of the first contact surface 341 when viewed from the +Z direction, as illustrated in FIG. 7. The second contact surface 343 is parallel to the XY plane.

When the cartridge 1 is placed on a substantially horizontal surface such as a desk in a posture in which the surface of the cartridge 1 in the −Z direction faces downward, that is, in a posture in which the first roller-side engagement portion 41 of the first roller-side engagement portion 41 and the second roller-side engagement portion 43 faces downward, the first roller-side engagement portion 41 is supported by the third case-side roller engagement portion 331. At this time, since the first contact surface 341 is larger than the second contact surface 343, the platen roller 3 is inclined so that the first roller-side contact surface 49 comes into contact with the first contact surface 341 of the first contact surface 341 and the second contact surface 343, and the platen roller 3 is in the second posture.

As illustrated in FIGS. 16 and 17, when the platen roller 3 is in the second posture, the end portion of the platen roller 3 in the +Z direction is farther from the ink ribbon 11 in the +Y direction than the end portion of the platen roller 3 in the −Z direction, as described above. That is, when the platen roller 3 is in the first posture, the platen roller 3 is substantially in contact with the ink ribbon 11, but when the platen roller 3 is in the second posture, there is a gap between the platen roller 3 and the ink ribbon 11. Therefore, when the tape 21 is inserted between the ink ribbon 11 and the platen roller 3 from the tape insertion port 33, the tape 21 can be prevented from being caught on the platen roller 3.

When the tape cartridge 1T is mounted on the cartridge mounting portion 511, the platen roller 3 is in the first posture illustrated in FIG. 16 by inserting the platen shaft 513 extending in the Z axis in the cartridge mounting portion 511 into the roller shaft 39 of the platen roller 3. At this time, as illustrated in FIG. 15, the first roller-side contact surface 49 comes into contact with the second contact surface 343 of the surfaces of the third case-side roller engagement portion 331 in the +Z direction, and the platen roller 3 is supported by the second contact surface 343. Therefore, when the platen roller 3 rotates, the platen roller 3 can be prevented from inclining with respect to the platen shaft 513, and the platen roller 3 can appropriately feed the tape 21 and the ink ribbon 11. By the platen roller 3 being in the first posture, since the tape 21 is pushed in the −Y direction by the platen roller 3, and the end portion of the tape 21 in the +Z direction is separated from the tape introduction path 35 in the −Y direction and is pushed by the feed projected portion 225, the tape 21 can be prevented from coming out of the tape introduction path 35 in the +Z direction.

Second Tape Guide

Figure 18:
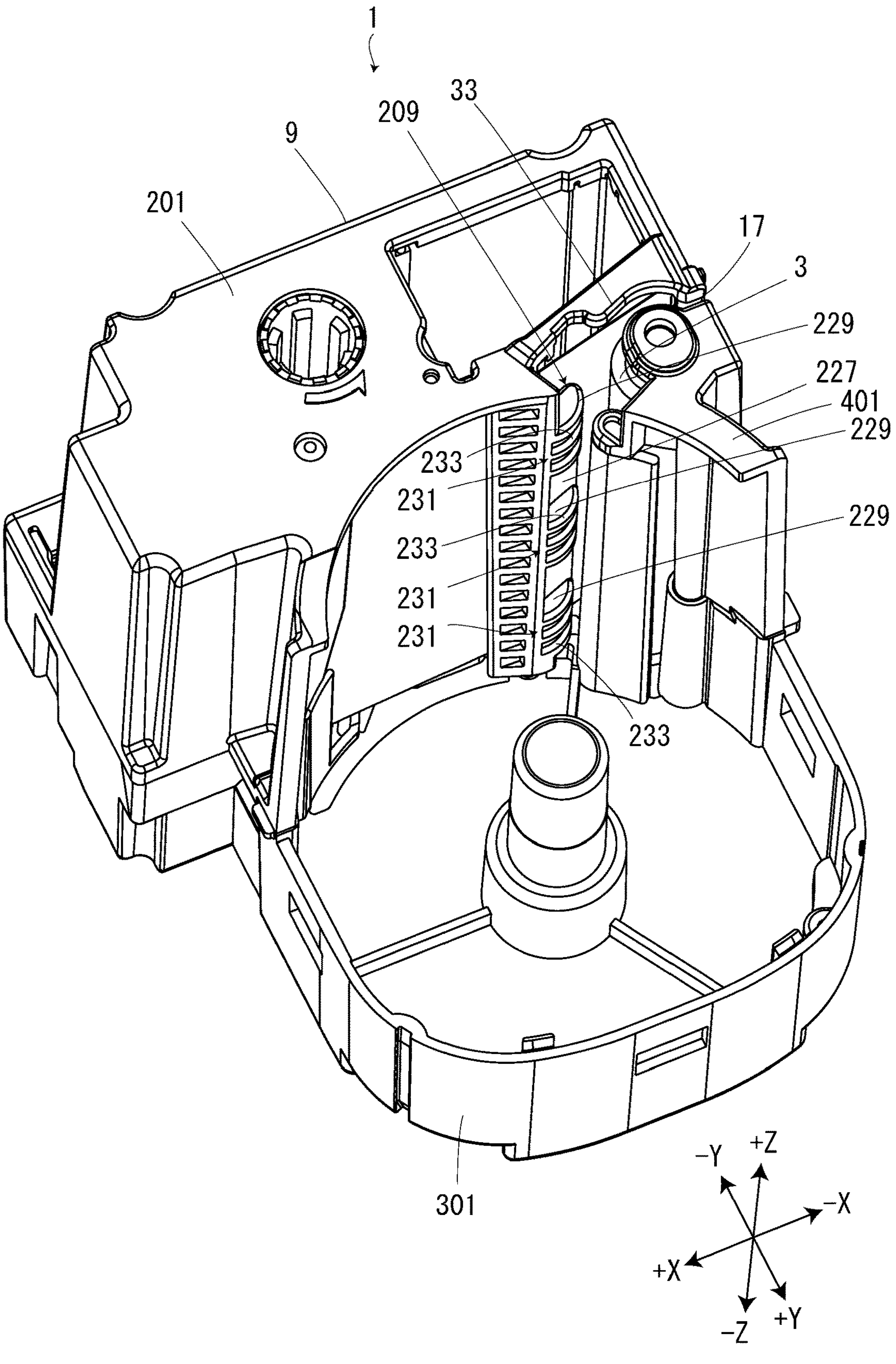
FIG. 18 is a perspective view of the cartridge from which the first case portion is removed, viewed from an angle different from that of FIG. 5.
Figure 19:
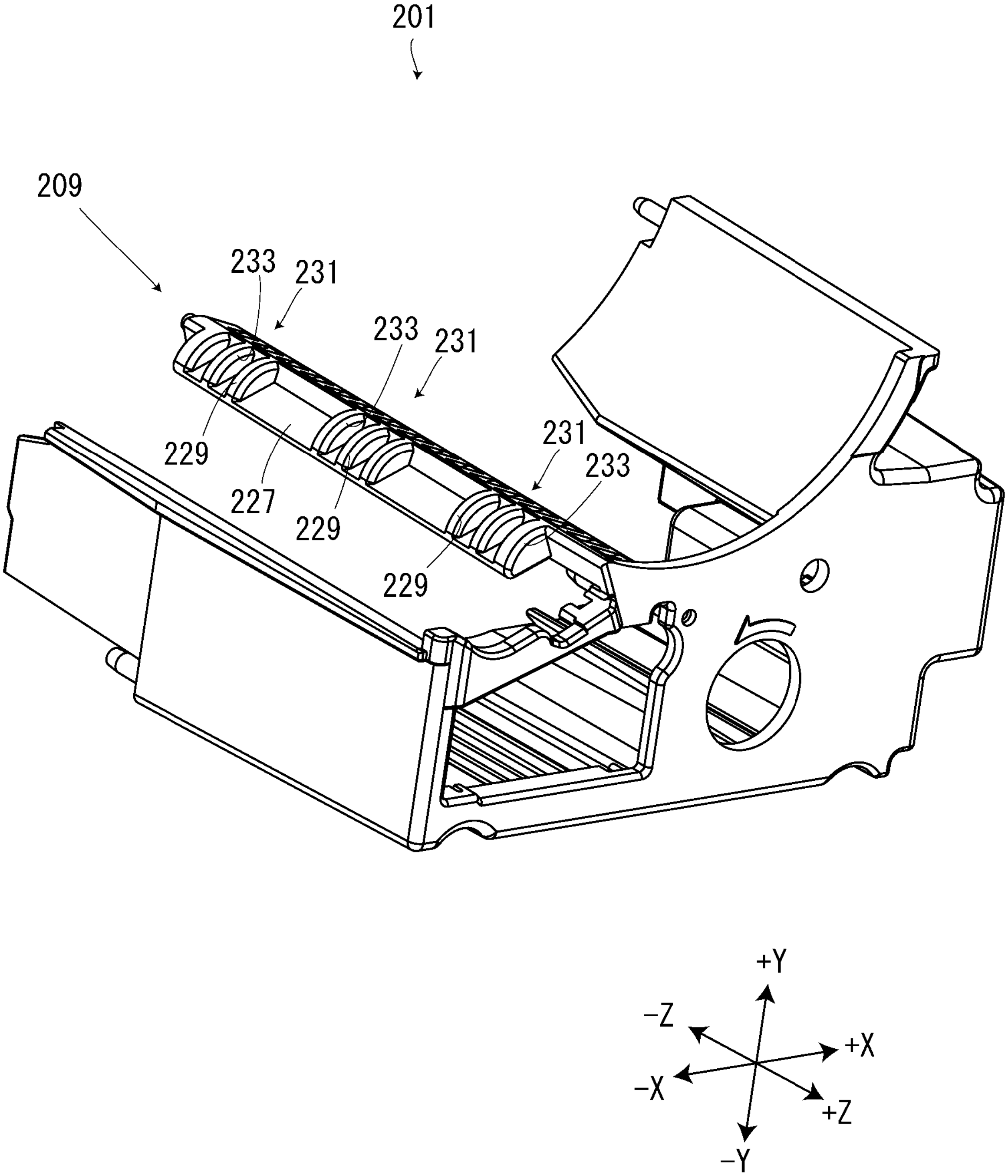
FIG. 19 is a perspective view of the second case portion viewed from an angle different from that of FIG. 10.

As illustrated in FIGS. 18 and 19, the tape guide 209 is provided with a guide base portion 227 and nine protruding portions 229. Since the tape guide 209 is provided with a plurality of protruding portions 229, the tape guide 209 can appropriately guide the tape 21 over the entire width direction of the tape 21.

The guide base portion 227 is formed in a substantially rectangular plate shape elongated in the Z axis. The protruding portion 229 protrudes from the guide base portion 227 in the +Y direction. The protruding portion 229 is formed in a substantially semicircular plate shape, and comes into contact with the tape 21 on the peripheral surface thereof. That is, the contact surface of the protruding portion 229 is formed in an arc shape and comes into contact with the printed surface of the tape 21 fed to the tape feed port 17. Since the protruding portion 229 is formed in a plate shape, the contact area between the protruding portion 229 and the tape 21 can be reduced. In addition, since the contact surface of the protruding portion 229 that comes into contact with the tape 21 is formed in an arc shape, the contact area between the protruding portion 229 and the tape 21 can be reduced.

The nine protruding portions 229 are provided so as to be distributed in the width direction of the tape 21, that is, in the −Z direction. The nine protruding portions 229 constitute three protruding groups 231. The interval between the protruding groups 231 is wider than the interval between the protruding portions 229 included in the same protruding group 231. Therefore, between the protruding group 231 and the protruding group 231, the width of the non-contact area of the tape 21 that does not come into contact with the protruding portions 229 is wider than that in the configuration in which the nine protruding portions 229 are provided at equal intervals. Therefore, the feeding load of the tape 21 due to friction with the tape guide 209 can be reduced.

The interval between the protruding groups 231 means the interval between the n-th protruding group 231 and the (n+1)-th protruding group 231 counted from the +Z direction, that is, the interval between the protruding portion 229 positioned closest to the −Z direction in the n-th protruding group 231 and the protruding portion 229 positioned closest to the +Z direction in the (n+1)-th protruding group 231. n is an integer greater than or equal to 1. In addition, the interval between the protruding portions 229 included in the same protruding group 231 means the interval between the m-th protruding portion 229 and the (m+1)-th protruding portion 229 counted from the +Z direction in any protruding group 231. m is an integer greater than or equal to 1.

A tape guide chamfered portion 233 is provided at the end portion of each protruding portion 229 in the +Z direction. Unlike the present embodiment, in the configuration in which the tape guide chamfered portion 233 is not provided at an end portion of each protruding portion 229 in the +Z direction, when the tape 21 is inserted from the tape insertion port 33, the inserted tape 21 may get caught on the protruding portion 229 provided in the tape guide 209. On the other hand, in the present embodiment, since the tape guide chamfered portion 233 is provided at the end portion of each protruding portion 229 in the +Z direction, when the tape 21 is inserted from the tape insertion port 33, the tape 21 can be prevented from being caught on the protruding portion 229.

As described above, the cartridge 1 of the present embodiment is a cartridge 1 that can be mounted on the tape printer 501 and is provided with the ribbon roll 5 and the cartridge case 9. The cartridge case 9 can accommodate the tape roll 19 and accommodates the ribbon roll 5. The cartridge case 9 is provided with the third case portion 301, the first case portion 101, and the second case portion 201. The first case portion 101 can accommodate the tape roll 19 between the first case portion 101 and the third case portion 301. The second case portion 201 is separated from the first case portion 101 and accommodates the ribbon roll 5 between the second case portion 201 and the third case portion 301. The first case portion 101 can be attached to and detached from the third case portion 301.

According to this configuration, the operator can remove only the first case portion 101 from the third case portion 301 of the first case portion 101 and the second case portion 201. As a result, the operator can post-insert the tape roll 19 into the cartridge case 9 without unraveling the ribbon roll 5.

In addition, the cartridge 1 of the present embodiment is a cartridge 1 that can be mounted on the tape printer 501 and is provided with the cartridge case 9 that can accommodate the tape roll 19. The cartridge case 9 is provided with the third case portion 301, the first case portion 101, the second case portion 201, and the fourth case portion 401. The first case portion 101 can accommodate the tape roll 19 between the first case portion 101 and the third case portion 301 and can be attached to and detached from the third case portion 301. The second case portion 201 is separated from the first case portion 101. The fourth case portion 401 is separated from the first case portion 101. The tape feed port 17 and the tape insertion port 33 are provided between the second case portion 201 and the fourth case portion 401. The tape 21 fed out from the tape roll 19 is fed out of the cartridge case 9 from the tape feed port 17. When the tape roll 19 is accommodated in the cartridge case 9, the tape 21 pulled out from the tape roll 19 can be inserted into the tape insertion port 33 in the −Z direction from one end portion in the −Z direction, which is one of the width directions of the tape 21, so that the leading edge of the tape 21 comes out of the cartridge case 9 from the tape feed port 17.

According to this configuration, the operator can accommodate the tape roll 19 in the cartridge case 9 in a state where the leading edge of the tape 21 came out of the cartridge case 9 from the tape feed port 17, without the troublesome task of manually rotating the tape roll 19 to feed the tape 21 to the tape feed port 17.

In addition, the cartridge 1 of the present embodiment is a cartridge 1 that can be mounted on the tape printer 501 and is provided with the cartridge case 9 that can accommodate the tape roll 19. The cartridge case 9 is provided with the tape feed port 17, the tape insertion port 33, and the tape guide 209. The tape 21 fed out from the tape roll 19 is fed out of the cartridge case 9 from the tape feed port 17. When the tape roll 19 is accommodated in the cartridge case 9, the tape 21 pulled out from the tape roll 19 can be inserted into the tape insertion port 33 in the −Z direction from one end portion in the −Z direction, which is one of the width directions of the tape 21, so that the leading edge of the tape 21 comes out of the cartridge case 9 from the tape feed port 17. The tape guide 209 is positioned in the −Z direction with respect to the tape insertion port 33 and guides the feed of the tape 21 by the tape printer 501. The tape guide 209 is provided with the protruding portion 229 that comes into contact with the tape 21. The tape guide chamfered portion 233 is provided at the end portion of the protruding portion 229 in the +Z direction.

According to this configuration, since the tape guide chamfered portion 233 is provided at the end portion of each protruding portion 229 in the +Z direction, when the tape 21 is inserted from the tape insertion port 33, the tape 21 can be prevented from being caught on the protruding portion 229.

Second Embodiment

Figure 20:
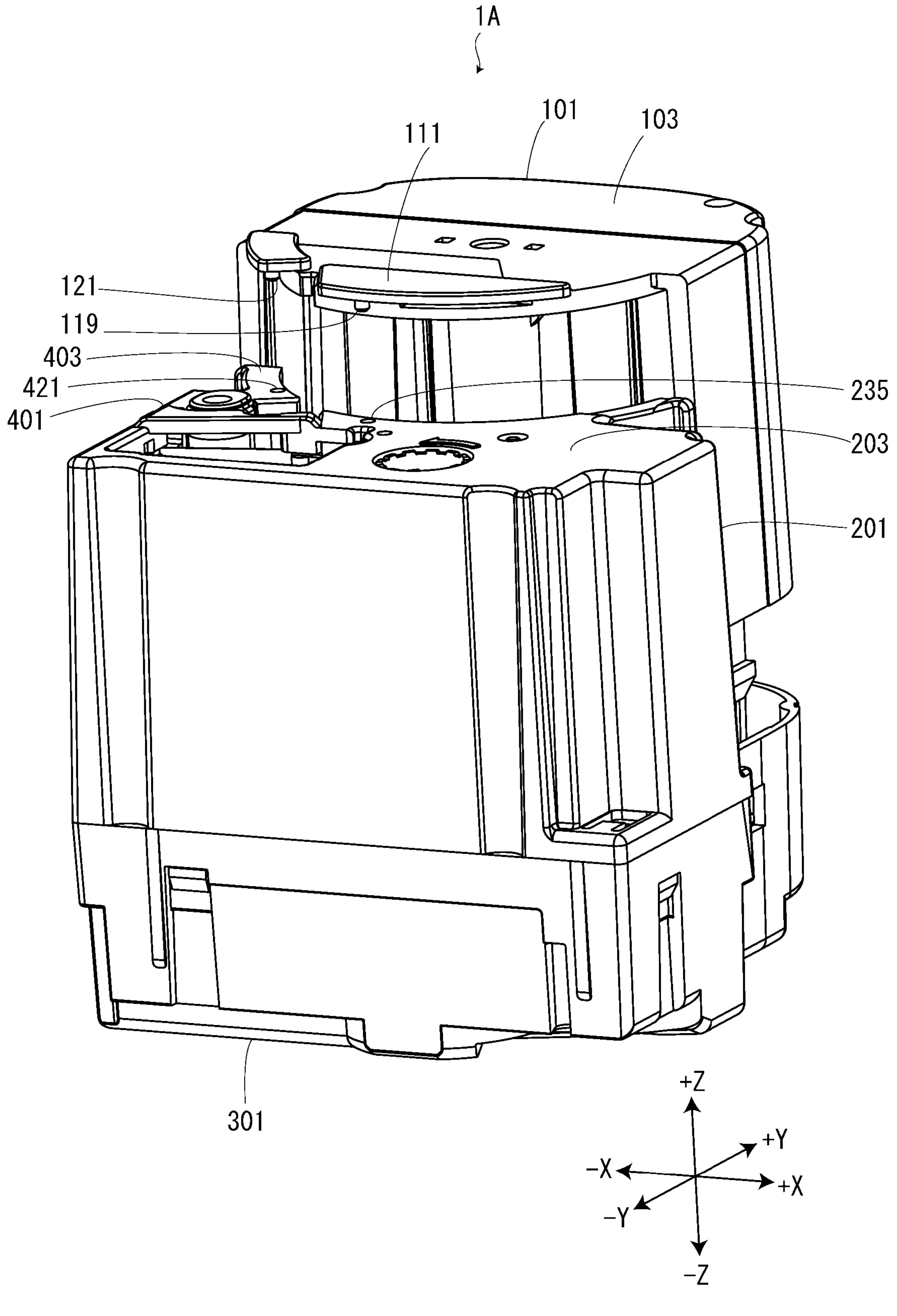
FIG. 20 is a perspective view of a cartridge of a second embodiment.

A cartridge 1A, which is a second embodiment of the cartridge, will be described with reference to FIG. 20. The cartridge 1A of the second embodiment has substantially the same configuration as the cartridge 1 of the first embodiment, but differs in that the first case portion 101 and the second case portion 201 are engaged with each other, and the first case portion 101 and the fourth case portion 401 are engaged with each other.

The first case portion 101 is provided with the first A engagement portion 119 and the first B engagement portion 121. The first A engagement portion 119 and the first B engagement portion 121 protrude from the first base wall portion 103 in the −Z direction. The first A engagement portion 119 is provided in the overlap portion 111, but the position thereof is not particularly limited. The first A engagement portion 119 engages with a second engagement recessed portion 235 provided in the second base wall portion 203 of the second case portion 201. The first B engagement portion 121 engages with a fourth engagement recessed portion 421 provided in the fourth base wall portion 403 of the fourth case portion 401.

The first A engagement portion 119 is not press-fitted into the second engagement recessed portion 235, unlike the second engagement pin 219 described above is press-fitted into the third A engagement hole 335. Therefore, even when the first A engagement portion 119 and the second engagement recessed portion 235 are engaged with each other, the first case portion 101 can be easily removed from the third case portion 301 by hand. The same applies to the first B engagement portion 121.

Since the first A engagement portion 119 and the second engagement recessed portion 235 are engaged with each other, the first case portion 101 and the second case portion 201 can be prevented from swinging in the X axis or the Y axis. Therefore, the rigidity of the entire cartridge case 9 can be improved. Similarly, since the first B engagement portion 121 and the fourth engagement recessed portion 421 are engaged with each other, the first case portion 101 and the fourth case portion 401 can be prevented from swinging in the X axis or the Y axis. Therefore, the rigidity of the entire cartridge case 9 can be improved.

The configuration is not limited to the configuration in which the first case portion 101 is provided with the first A engagement portion 119 and the second case portion 201 is provided with the second engagement recessed portion 235, and a configuration in which the first case portion 101 is provided with an engagement recessed portion and the second case portion 201 is provided with an engagement portion may be employed. Furthermore, a configuration in which the first case portion 101 is provided with an engagement portion and an engagement recessed portion, and the second case portion 201 is provided with an engagement recessed portion that engages with the engagement portion provided in the first case portion 101 and an engagement portion that engages with the engagement recessed portion provided in the first case portion 101 may be employed. The same applies to the first case portion 101 and the fourth case portion 401.

In addition, the engagement portion is not limited to those protruding from the first base wall portion 103 such as the first A engagement portion 119 and the first B engagement portion 121, and for example, the entire overlap portion 111 may function as the first A engagement portion 119. That is, a configuration in which the second case portion 201 is provided with an engagement recessed portion that engages with the overlap portion 111 may be employed.

Other Modification Examples

It goes without saying that the present disclosure is not limited to the above-described embodiments, and that various configurations can be adopted without departing from the spirit of the embodiments. For example, the above embodiment can be modified into the following aspects in addition to those described above. In addition, a configuration in which the embodiments and modification examples are respectively combined may be used.

The first case portion 101, the second case portion 201, the third case portion 301, and the fourth case portion 401 are not limited to a configuration separate from each other, and other configurations may be used when the first case portion 101 is separated from any of the second case portion 201, the third case portion 301, and the fourth case portion 401. For example, the second case portion 201 and the third case portion 301 may be integrated with each other, the second case portion 201 and the fourth case portion 401 may be integrated with each other, and the third case portion 301 and the fourth case portion 401 may be integrated with each other. Furthermore, the second case portion 201, the third case portion 301, and the fourth case portion 401 may be integrated with one another.

The configuration is not limited to the configuration in which the second case portion 201 is provided with the feed projected portion 225 and the fourth case portion 401 is provided with the facing edge portion 417 and the inclined edge portion 419, and a configuration in which the second case portion 201 is provided with a facing edge portion and an inclined edge portion and the fourth case portion 401 is provided with a feed projected portion may be employed.

The protrusion height of the protruding portion 229 may vary depending on the material and thickness of the tape 21 accommodated in the cartridge case 9. In addition, the protrusion height may be different among the plurality of protruding portions 229. For example, when the tape 21 accommodated in the cartridge case 9 is a die-cut tape, the protruding portion 229 in contact with a waste lifting portion may be raised and the protruding portion 229 in contact with a label portion may be lowered. The number of protruding portions 229 may vary depending on the material and thickness of the tape 21 accommodated in the cartridge case 9. For example, when the tape 21 accommodated in the cartridge case 9 is highly rigid such as a magnetic tape, the protruding portions 229 may be disposed at two locations corresponding to both end portions of the tape 21 in the width direction.

APPENDIX

A description of the cartridge is added.

A cartridge configured to be mounted on a tape printer, the cartridge including a cartridge case configured to accommodate a tape roll around which a tape is wound, in which the cartridge case is provided with a tape feed port through which the tape fed from the tape roll accommodated in the cartridge case is fed out of the cartridge case, a tape insertion port into which the tape pulled out from the tape roll is configured to be inserted in a first direction from one end portion in a width direction of the tape, so that a leading edge of the tape comes out of the cartridge case from the tape feed port, when the tape roll is accommodated in the cartridge case, and a tape guide that is positioned in the first direction with respect to the tape insertion port and guides feeding of the tape by the tape printer, the tape guide is provided with a tape contact portion that comes into contact with the tape fed to the tape feed port, and a chamfered portion is provided at an end portion of the tape contact portion in a second direction opposite to the first direction.

According to this configuration, since the tape contact portion is provided with the chamfered portion, it is possible to prevent the tape from being caught on the tape contact portion when the tape is inserted from the tape insertion port.

The protruding portion 229 is an example of a "tape contact portion". The "tape guide chamfered portion 233" is an example of a "chamfered portion". The −Z direction is an example of the "first direction". The +Z direction is an example of the "second direction".

In this case, it is preferable that the tape guide includes a guide base portion, and a protruding portion that protrudes from the guide base portion and functions as the tape contact portion.

According to this configuration, the contact area between the tape guide and the tape can be reduced.

In this case, it is preferable that the protruding portion is formed in a plate shape.

According to this configuration, the contact area between the protruding portion and the tape can be reduced.

In this case, it is preferable that a contact surface of the protruding portion that comes into contact with the tape is formed in an arc shape.

According to this configuration, the contact area between the protruding portion and the tape can be reduced.

In this case, it is preferable that the tape guide includes a plurality of protruding portions.

According to this configuration, the tape can be appropriately guided over the entire width direction of the tape.

In this case, it is preferable that the plurality of protruding portions are provided so as to be distributed in the first direction, the plurality of protruding portions constitute a plurality of protruding groups, and an interval between the protruding groups in the first direction is wider than an interval between the protruding portions included in the same protruding group.

According to this configuration, between the protruding group and the protruding group, the width of the non-contact area of the tape that does not come into contact with the protruding portions is wider than that in the configuration in which the plurality of protruding portions are provided at equal intervals. Therefore, the feeding load of the tape due to friction with the tape guide can be reduced.

In this case, it is preferable that the cartridge further includes a platen roller that feeds the tape between the platen roller and a thermal head provided in the tape printer when the cartridge is mounted on the tape printer, in which the cartridge case includes a third case portion, a first case portion configured to accommodate the tape roll between the first case portion and the third case portion and to be attached to and detached from the third case portion, a second case portion that is separated from the first case portion, and a fourth case portion that is separated from the first case portion and accommodates the platen roller between the fourth case portion and the third case portion, and the tape feed port and the tape insertion port are provided between the second case portion and the fourth case portion.

According to this configuration, the operator can remove only the first case portion from the third case portion of the first case portion and the fourth case portion. As a result, the operator can post-insert the tape roll into the cartridge case without removing the platen roller from the cartridge case.

In this case, it is preferable that a tape introduction path that introduces the tape inserted from the tape insertion port to the tape feed port is provided between the second case portion and the fourth case portion, a feed projected portion is provided at an edge portion of the tape feed port so as to block the tape feed port in the second direction opposite to the first direction, and a facing edge portion facing the feed projected portion and an inclined edge portion inclined with respect to the facing edge portion so as to introduce the tape inserted from between the feed projected portion and the facing edge portion to the tape feed port is provided at an edge portion of the tape introduction path.

According to this configuration, it is possible to prevent the tape from coming out of the tape feed port in the second direction by providing the feed projected portion. In addition, since the inclined edge portion is provided, the tape pulled out from the tape roll can be easily inserted from the tape insertion port into the tape feed port.

What is claimed is:

1. A cartridge configured to be mounted on a tape printer, the cartridge comprising:

a cartridge case configured to accommodate a tape roll around which a tape is wound, wherein the cartridge case is provided with a tape feed port through which the tape fed from the tape roll accommodated in the cartridge case is fed out of the cartridge case, a tape insertion port into which the tape pulled out from the tape roll is configured to be inserted in a first direction from one end portion in a width direction of the tape, so that a leading edge of the tape comes out of the cartridge case from the tape feed port, when the tape roll is accommodated in the cartridge case, a tape guide that is positioned in the first direction with respect to the tape insertion port and guides feeding of the tape by the tape printer, the tape guide is provided with a tape contact portion that comes into contact with the tape fed to the tape feed port, and a chamfered portion is provided at an end portion of the tape contact portion in a second direction opposite to the first direction.

2. The cartridge according to claim 1, wherein the tape guide includes a guide base portion, and a protruding portion that protrudes from the guide base portion and functions as the tape contact portion.

3. The cartridge according to claim 2, wherein the protruding portion is formed in a plate shape.

4. The cartridge according to claim 2, wherein a contact surface of the protruding portion that comes into contact with the tape is formed in an arc shape.

5. The cartridge according to claim 2, wherein the tape guide includes a plurality of the protruding portions.

6. The cartridge according to claim 5, wherein the plurality of protruding portions are provided so as to be distributed in the first direction, the plurality of protruding portions constitute a plurality of protruding groups, and an interval between the protruding groups in the first direction is wider than an interval between the protruding portions included in the same protruding group.

7. The cartridge according to claim 1, further comprising:

a platen roller that feeds the tape between the platen roller and a thermal head provided in the tape printer when the cartridge is mounted on the tape printer, wherein the cartridge case includes a third case portion, a first case portion configured to accommodate the tape roll between the first case portion and the third case portion and to be attached to and detached from the third case portion, a second case portion that is separated from the first case portion, and a fourth case portion that is separated from the first case portion and accommodates the platen roller between the fourth case portion and the third case portion, and the tape feed port and the tape insertion port are provided between the second case portion and the fourth case portion.

8. The cartridge according to claim 1, wherein a tape introduction path that introduces the tape inserted from the tape insertion port to the tape feed port is provided between the second case portion and the fourth case portion, a feed projected portion is provided at an edge portion of the tape feed port so as to block the tape feed port in a second direction opposite to the first direction, and a facing edge portion facing the feed projected portion and an inclined edge portion inclined with respect to the facing edge portion so as to introduce the tape inserted from between the feed projected portion and the facing edge portion to the tape feed port are provided at an edge portion of the tape introduction path.

* * * * *